United States Patent
Wentink

(10) Patent No.: US 9,900,759 B2
(45) Date of Patent: Feb. 20, 2018

(54) METHOD AND APPARATUS FOR PEER DISCOVERY IN A WIRELESS COMMUNICATION NETWORK

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 12/917,382

(22) Filed: Nov. 1, 2010

(65) Prior Publication Data

US 2011/0103264 A1     May 5, 2011

Related U.S. Application Data

(60) Provisional application No. 61/258,131, filed on Nov. 4, 2009, provisional application No. 61/292,395, filed on Jan. 5, 2010.

(51) Int. Cl.
  *H04W 8/00*   (2009.01)
  *H04W 76/02*  (2009.01)
  *H04W 84/22*  (2009.01)

(52) U.S. Cl.
  CPC .......... *H04W 8/005* (2013.01); *H04W 76/023* (2013.01); *H04W 84/22* (2013.01)

(58) Field of Classification Search
  CPC ..................................... H04W 76/022–76/023
  (Continued)

(56) References Cited

U.S. PATENT DOCUMENTS 7,522,571 B2  4/2009  Ginzburg
8,755,362 B2  6/2014  Laroia et al.
(Continued)

FOREIGN PATENT DOCUMENTS

JP    2007060029 A    3/2007
KR    20090098568 A   9/2009
(Continued)

OTHER PUBLICATIONS

IEEE 802.11-10/0466r3 (Aug. 2010) .TDLS Discovery Information. See sections 7.3.2.96, 7.3.2.16, 7.3.2.11, Y.1 and Y.2.
(Continued)

*Primary Examiner* — Hassan Kizou
*Assistant Examiner* — Ashil Farahmand
(74) *Attorney, Agent, or Firm* — Silicon Valley Patent Group LLP

(57) ABSTRACT

Apparatus and methods of peer discovery in a communications network include generating a discovery request configured to identify a Tunneled Direct Link Setup (TDLS) capable peer device, transmitting the discovery request, and determining if a discovery response is received in response to the discovery request. In an aspect, the apparatus and methods may encapsulate the discovery request in a data frame such that the discovery request is transparent to an access point. In other aspects, the apparatus and methods may form the discovery request by appending TDLS capability information to a probe request. Additionally, the apparatus and methods may include determining if a discovery response is received in response to the discovery request. Thus, the apparatus and methods provide a deterministic method of peer discovery, so that a list of potential peers that are TDLS capable can be available before attempting a TDLS direct link setup.

40 Claims, 21 Drawing Sheets

(58) Field of Classification Search
USPC .......................................................... 370/255
See application file for complete search history.

(56) References Cited

U.S. PATENT DOCUMENTS

| | | | |
|---|---|---|---|
| 2005/0025092 A1* | 2/2005 | Morioka et al. | 370/328 |
| 2006/0165035 A1 | 7/2006 | Chandra et al. | |
| 2006/0215601 A1 | 9/2006 | Vleugels et al. | |
| 2006/0252389 A1* | 11/2006 | Yellin et al. | 455/115.3 |
| 2006/0285507 A1* | 12/2006 | Kinder et al. | 370/310 |
| 2007/0104138 A1 | 5/2007 | Rudolf et al. | |
| 2007/0242665 A1* | 10/2007 | Habetha et al. | 370/389 |
| 2010/0040007 A1* | 2/2010 | Itagaki | H04L 47/10 370/329 |
| 2010/0177712 A1* | 7/2010 | Kneckt et al. | 370/329 |
| 2011/0007692 A1* | 1/2011 | Seok | 370/328 |

FOREIGN PATENT DOCUMENTS

| | | |
|---|---|---|
| WO | WO2006119281 A2 | 11/2006 |
| WO | 07082281 | 7/2007 |
| WO | 2009038348 A1 | 3/2009 |
| WO | 2009064113 A2 | 5/2009 |
| WO | WO2009113834 A2 | 9/2009 |

OTHER PUBLICATIONS

IEEE P802.11z/D13.0 (Aug. 2010). IEEE Draft Standard for Information Technology—Telecommunications and information exchange between systems—Local and Metropolitan Area networks—Specific requirements—Part 11: Wireless LAN Medium Access Control (MAC) and Physical Layer (PHY) specifications—Amendment 7: Extensions to Direct Link Setup (DLS) (Amendment to IEEE Std 802.11-2007) Digital object Identifier: 10.1109/IEEESTD.2010.5562722, pp. 1-91. See pp. 14-15, 25, 27, 32-40, 64.

IEEE Standard for Information Technology. Telecommunications and Information Exchange Between Systems. Local and Metropolitan Area Networks. Specific Requirements Part 11: Wireless LAN Medium Access Control (MAC) and Physical Layer (PHY) Specifications Am, Standard No. IEEE STD 802.11Z-2010 (2010) IEEE, USA IEEE New York, NY, USA, [Online] Oct. 14, 2010 (Oct. 14, 2010), XP002617166, ISBN: 978-0-7381-6499-1 Retrieved from the Internet: URL:http://ieeexplore.ieee.org/xpls/abs_all.jsp?arnumber=5605400&tag=1> [retrieved on Jan. 17, 2011] paragraphs [7.3.2.27], [7.4.7.11], [7.4.11.11], [11.21.3].

International Search Report and Written Opinion—PCT/US2010/055306—ISA/EPO—dated Feb. 2, 2011.

Taiwan Search Report—TW099137988—TIPO—dated Jun. 3, 2013.

Taiwan Search Report—TW099137988—TIPO—dated Feb. 17, 2014.

* cited by examiner

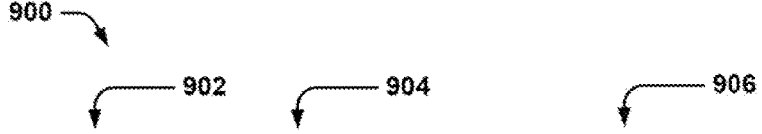

| Order | Information Element Field | Description |
|---|---|---|
| 1 | Category | The category field is set to the value for TDLS |
| 2 | Action | The Action field is set to *TBD*, representing TDLS Discovery Request |
| 3 | Dialog Token | The Dialog Token field contains a unique non-zero value for the conversation between the STAs involved in this request |
| 4 | Link Identifier 176 | The Link Identifier element specifies the addresses related to the STA sending the TDLS discovery request frame |
| 5 | Other IEs (optional) | One or more other information elements may be included |
| Last | Vendor Specific (optional) | One or more Vendor Specific information elements may be included |

1000

1002  1004  1006

| Order | Information Element Field | Description |
|---|---|---|
| 1 | Category | The category field is set to the value for TDLS |
| 2 | Action | The Action field is set to *TBD*, representing TDLS Discovery Response |
| 3 | Dialog Token | The Dialog Token field is copied from the corresponding TDLS Discovery Request frame |
| 4 | Link Identifier 178 | The Link Identifier element specifies the addresses of the STAs involved in TDLS discovery |
| 5 | Other IEs (optional) | One or more other information elements may be included |
| Last | Vendor Specific (optional) | One or more Vendor Specific information elements may be included |

*FIG. 13*

METHOD AND APPARATUS FOR PEER DISCOVERY IN A WIRELESS COMMUNICATION NETWORK

CLAIM OF PRIORITY UNDER 35 U.S.C. §119

The present application for patent claims priority to Provisional Application No. 61/258,131 entitled "METHOD AND APPARATUS FOR MULTI-PROTOCOL DEVICE DISCOVERY IN WIRELESS LOCAL AREA NETWORKS (WLAN)" filed Nov. 4, 2009, and Provisional Application No. 61/292,395 entitled "METHOD AND APPARATUS FOR MULTI-PROTOCOL DEVICE DISCOVERY IN WIRELESS LOCAL AREA NETWORKS (WLAN)" filed Jan. 5, 2010, both of which are assigned to the assignee hereof and hereby expressly incorporated by reference herein.

BACKGROUND

Field

This disclosure relates generally to apparatus and methods for device discovery in a wireless communication network, and more particularly, the disclosure relates to peer device discovery in WLAN systems based on the IEEE 802.11 protocol (WiFi).

Background

In many telecommunication systems, communications networks are used to exchange messages among several interacting spatially-separated devices. The various types of networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, hulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource Management among the network users and higher levels of mutual coordination and cooperation for compatible spectrum utilization.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of peer discovery in a communications network, comprising generating a discovery request configured to identify a Tunneled Direct Link Setup (TDLS) capable peer device, transmitting the discovery request, and determining if a discovery response is received in response to the discovery request.

In another aspect, at least one processor configured to perform peer device discovery in a communications network comprises a first hardware module for generating a discovery request configured to identify a Tunneled Direct Link Setup (TDLS) capable peer device. Further, the at least one processor includes a second module for transmitting the discovery request, and a third module for determining if a discovery response is received in response to the discovery request.

In a further aspect, a computer program product for peer device discovery in a communications network comprises a non-transitory computer-readable medium, including a first set of codes executable for causing a computer to generate a discovery request configured to identify a Tunneled Direct Link Setup (TDLS) capable peer device. The non-transitory computer-readable medium further includes a second set of codes executable for causing the computer to transmit the discovery request, and a third set of codes executable for causing the computer to determine if a discovery response is received in response to the discovery request.

In another aspect, an apparatus for peer device discovery in a communications network comprises means for generating a discovery request configured to identify a Tunneled Direct Link Setup (TDLS) capable peer device, means for transmitting the discovery request, and means for determining if a discovery response is received in response to the discovery request.

In an additional aspect, a user station apparatus for peer device discovery in a communications network comprises a discovery request generator to generate a discovery request configured to identify a Tunneled Direct Link Setup (TDLS) capable peer device, a communications component to transmit the discovery request, and a discovery response determiner to determine if a discovery response is received in response to the discovery request.

Moreover, additional aspects may include a method for detecting and responding to discovery requests as described herein. Further aspects in this regard may include at least one processor comprising modules to perform the detecting and responding to the discovery request, a computer program product comprising computer readable medium including instructions executable by a computer to detect and respond to the discovery request, or an apparatus comprising means for or components for detecting and responding to the discovery request.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, wherein dashed lines around components indicate optional elements, and in which:

FIG. 12 is a table of an aspect of elements of a format of a TDLS discovery request frame with a Link Identifier element that may be used in an aspect of the system of FIG. 1;

FIG. 13 is a table of an aspect of a format of a TDLS discovery response frame with a Link Identifier element that may be used in an aspect of the system of FIG. 1;

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
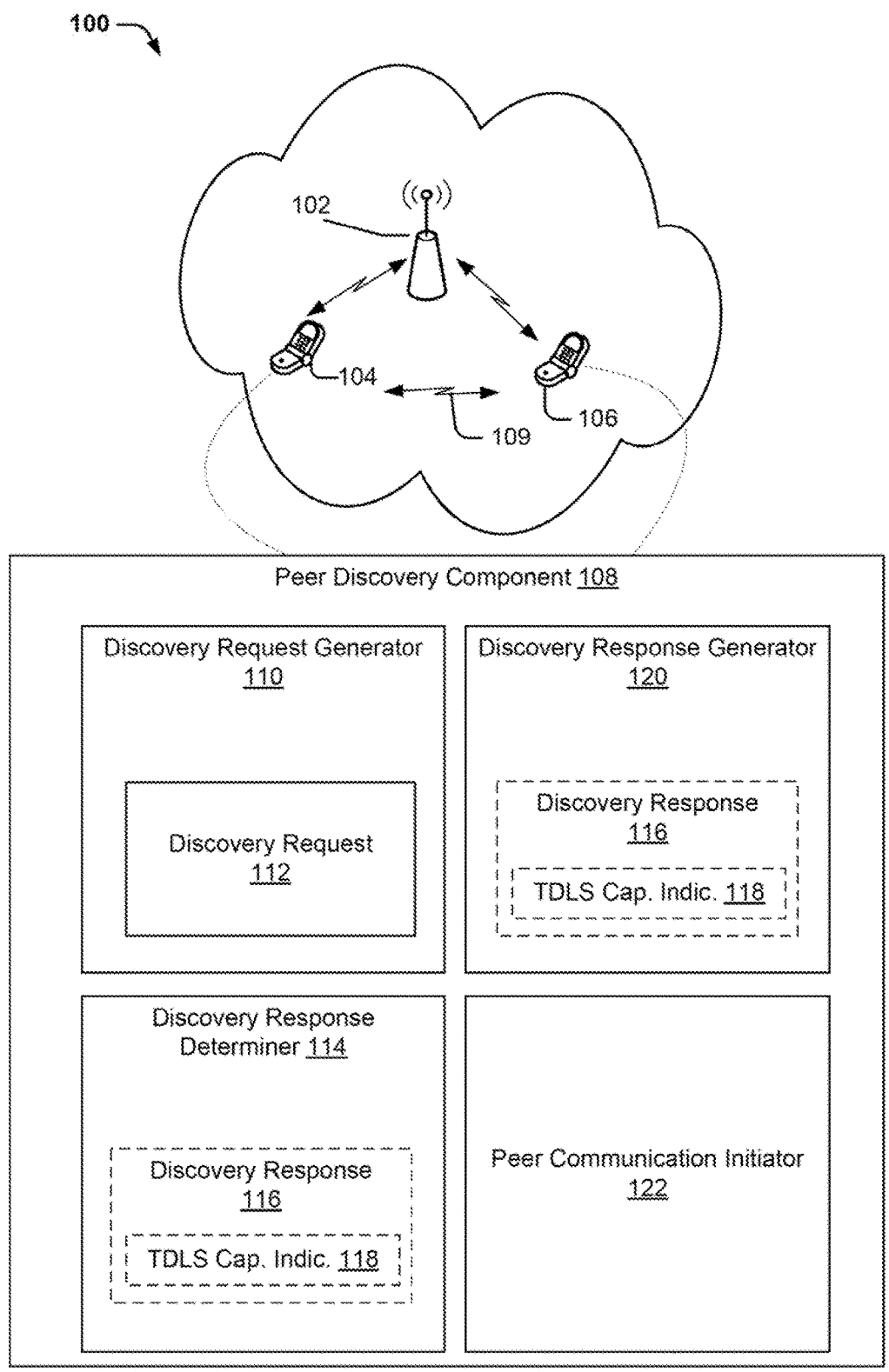
FIG. 1 is a schematic diagram of an aspect of a wireless communication network including stations implementing discovery protocols described herein.

Referring to FIG. 1, in one example, popular wireless network technologies include various types of wireless local area networks (WLANs). A WLAN 100 may be used to interconnect nearby devices together, employing widely used networking protocols such as WiFi or, more generally, a member of the IEEE 802.11 wireless protocol family.

In one aspect, a WLAN 100 is comprised of various stations (STA), which are the components which access the wireless network. In one example, there are two types of stations (STAs): access points 102 and clients 104, 106. In general, an access point serves as a hub or base station for the WLAN and a client serves as a user of the WLAN. For example, a client may be a laptop computer, a personal digital assistant (PDA), a mobile phone, etc. In one example, a client connects to an access point via a WiFi (e.g., IEEE 802.11 protocol) compliant wireless link to obtain general connectivity to the Internet or to other wide area networks.

In one aspect, 802.11 wireless networks may operate in two modes: infrastructure mode and ad-hoc mode. In infrastructure mode, a client or station (STA) connects to an access point (AP) which serves as a hub for connecting with other wireless clients to the network infrastructure, including, for example, Internet access. Infrastructure mode uses a client-server architecture to provide connectivity to the other wireless clients. In ad-hoc mode, wireless clients have direct connections to each other in a peer-to-peer architecture. In one aspect, 802.11 wireless networks generate a periodic Beacon signal which broadcasts wireless network characteristics (e.g., maximum data rate, encryption status, AP MAC address, SSID, etc.) to all nearby clients. For example, the SSID identifies a particular wireless network. An acronym list of some terminologies used is presented here.

Acronym List
AP Access Point
A1 Address 1
A2 Address 2
A3 Address 3
BSS Basic Service Set
BSSID Basic Service Set Identifier
DTIM Delivery Traffic Indication Map
IE Information Element
IEEE Institute of Electrical and Electronics Engineers
L2 Layer 2
MAC Media Access Control
OUI Organizationally Unique Identifier
P2P Peer-to-Peer
SNAP Subnetwork Access Protocol
SSID Service Set Identifier
STA Station
TDLS Tunneled Direct Link Setup
TSF Timing Synchronization Function
WFA WiFi Alliance
WFD WiFi Display
WiFi Wireless Fidelity In one aspect, the wireless protocol IEEE 802.11z defines a protocol which allows wireless 802.11 stations (STAs) that are associated with the same Access Point (AP) to set up a direct link, e.g. a wireless peer-to-peer connection, between them. The protocol is referred to as Tunneled Direct Link Setup (TDLS). The TDLS setup messages are encapsulated in a specific Ethertype, so that they can be tunneled through any AP. In one example, the Ethertype is a field within an Ethernet frame which indicates the protocol encapsulated within the frame payload. This is useful in particular because APs do not have to be upgraded for TDLS to be used between two STAs. TDLS direct links can be set up between two TDLS capable STAs without need to upgrade the AP.

Currently, TDLS assumes that discovery of other STAs in the same Basic Service Set (BSS) (e.g. associated with the same AP) is based on detecting source and destination addresses and sending a TDLS setup request without prior knowledge of the intended peer STA's capabilities. However, it is desirable to have a more deterministic method of discovery', so that a list of potential peer STAs that are TDLS capable can be available before attempting a TDLS direct link setup.

Accordingly, referring to back to FIG. 1, in an aspect, the described apparatus and methods include a peer discovery component 108 at one or more stations, such as at clients 104 and 106, to manage discovery of, and communication with, one or more other peer STAs. In an aspect, for example, peer discovery component 108 may be one or any combination of hardware, software, firmware, executable instructions, or data, executable to facilitate discovery of one or more peer STAs and initiate and/or establish setup of a TDLS direct link 109. In an aspect, peer discovery component 108 may include a discovery request generator 110 configured to generate a discovery request 112 for information on potential peer STAs. For example, in an aspect, discovery request 112 may include a discovery request frame having a particular format, and the discovery request frame may be encapsulated for transparent transmission through another STA, such as access point 102, as will be discussed in more detail below. Further, for example, in a different aspect, discovery request 112 may include or be appended to a probe request, or a beacon, transmitted as part of a Peer-to-Peer (P2P) discovery protocol. In this case, for example, discovery request 112 may include a TDLS capability indication, and optionally may include association information, as will be discussed in more detail below.

Moreover, peer discovery component 108 may additionally include a discovery response determiner 114 configured to determine if a discovery response 116 has been received. In an aspect, for example, discovery response 116 may include, or may provide an inference for determining a TDLS capability indication 118 of one or more peer STAs providing the discovery response 116, e.g. a discovered station or stations. Such a discovered station may be considered a peer device. TDLS capability indication 118 may be used for identifying a TDLS capable STA, TDLS capabilities of the identified STA, and/or any other parameters for establishing a TDLS communication, e.g. TDLS direct link 109, with the identified STA.

Additionally, peer discovery component 108 may additionally include a discovery response generator 120 configured to generate discovery response 116, such as based upon receipt of discovery request 112 from another STA. In other words, STA 106 may operate discovery response generator 120 to generate discovery response 116 in reply to receiving discovery request 112 from STA 104. Alternatively, or in addition, STA 104 may operate discovery response generator 120 to generate a second discovery response in reply to detecting or receiving a second discovery request from another device.

Moreover, peer discovery component 108 may further include a peer communication initiator 122 to establish communication with another peer STA. For example, in an aspect, peer communication initiator 122 is include protocols to initiate or to perform establishment of a TDLS communication with another STA based on STA information 118 received in discovery response 116.

For example, in the case of FIG. 1, if STA 104 transmits discovery request 112 that is received by STA 106, then STA 106 may generate discovery response 116 and transmit discovery response 116 for receipt by STA 104. Based on TDLS capability indication 118, STA 104 may then establish TDLS direct link 109 with STA 106.

Thus, the apparatus and methods of the described aspects provide a deterministic method of discovery, so that a list of potential peer STAs that are TDLS capable can be available before attempting a TDLS direct link setup.

In one aspect, with the advent of new connection types for WiFi devices, such as Peer-to-Peer (P2P) and Tunneled Direct Link Setup (TDLS), there is a need for device and service discovery over multiple connection protocols. Discovery refers to a computer protocol that facilitates obtaining access to a wireless device or service. TDLS is defined in the IEEE 802.11z protocol. Peer-to-Peer (P2P) protocol is currently also referred to as Wireless Fidelity (WiFi) Alliance (WFA) Direct. TDLS and P2P may likely become transport mechanisms for WFA Display (WFD). WFD is a WFA certification label for wireless connections with a display.

Figures 2, 3:
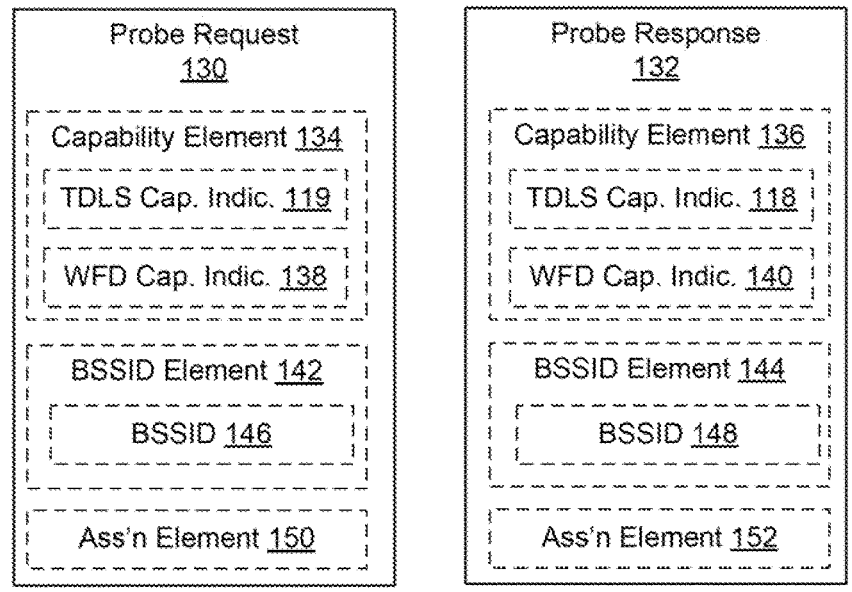
FIG. 2 is a block diagram of an aspect of a probe request that may be used in an aspect of the system of FIG. 1.
FIG. 3 is a block diagram of an aspect of a probe response that may be used in an aspect of the system of FIG. 1.

Referring to FIGS. 2 and 3, in one aspect, peer discovery component 108 (FIG. 1) may achieve discovery of potential TDLS peer devices by piggybacking TDLS discovery on P2P device discovery. P2P device discovery is based on a Probe Request/Probe Response exchange between the P2P devices on a so called social channel. For the purpose of TDLS peer STA discovery performed by peer discovery component 108 (FIG. 1), discovery request 112 and/or discovery response 116 may include the Probe Request frame 130 and/or Probe Response frame 132 including respective TDLS capability indication 119, corresponding to the requesting STA, and/or TDLS capability indication 118, corresponding to the responding STA.

In one aspect, the respective TDLS capability indication 118 or 119 may be a portion of a capability element 134 or 136, respectively. For example, where capability element 134 or 136 comprises Extended Capabilities element, the respective TDLS capability indication 118 or 119 may be a bit inside the Extended Capabilities element. Further, for example, the TDLS capability bit may be bit 37 of the Capabilities field of the Extended Capabilities element. In another example, the TDLS capability indication 118 or 119 may not be physically present, but may be inferred from a WFD capability indication 138 or 140 that is included in the Probe Request/Response frame 130/132, if TDLS is a mandatory part of WFD certification. In yet another example, the TDLS capability indication 118 or 119 may be inferred from a separate TDLS capability element, e.g. a specific type of capability element 134 or 136, which may be included in the Probe Request/Response frame 130/132.

The Peer-to-Peer (P2P) discovery procedure may also yield the Basic Service Set Identifier (BSSID) of an AP with which the TDLS capable device is currently associated. In one aspect, Basic Service Set in the IEEE 802.11 protocol is comprised of one access point (AP) and all associated stations (STA). To this end, referring to FIGS. 2 and 3, the current BSSID 146 or 148, corresponding to the requesting or the responding STA, respectively, may be included in the Probe Request/Response frames 130/132 transmitted as part of P2P discovery, in the form of a BSSID element 142 or 144.

Figure 4:
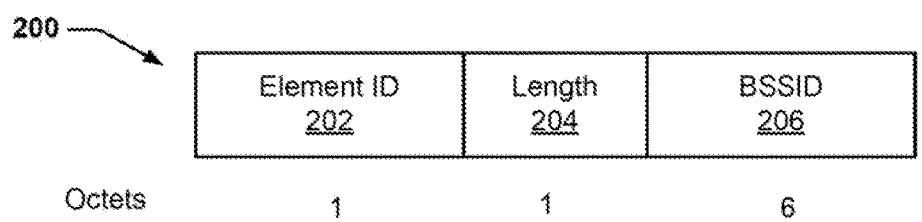
FIG. 4 is a block diagram of an aspect of a format of a base station set identifier (BSSID) element used in the system of FIG. 1.

Referring to FIG. 4, an example of a BSSID element format 200, such as for BSSID element 142 or 144 of FIGS. 2 and 3, includes the following:

The Element ID field 202 identifies the BSSID element, as defined in Table 7-26 of 802.11-2007 protocol definition The Length field 204 is set to 6

The BSSID field 206 is set to the MAC address of the AP to which the STA is currently associated Other information about the current association may be included in the Probe Request/Response 130 or 132 by including an Association Element 150 or 152. The Association Element 150 or 152 may contain information about a current association of the device (e.g., the respective STA) sending the Probe Request/Response frame 130 or 132.

Figure 5:
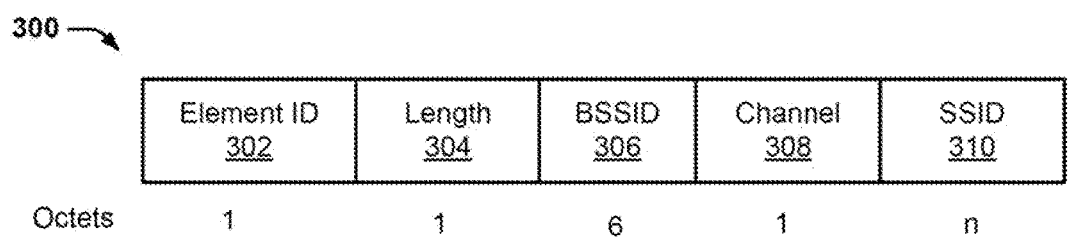
FIG. 5 is a block diagram of an aspect of a format of an Association Element used in the system of FIG. 1.

Referring to FIG. 5, an example of an Association Element format 300, such as for association element 150 or 152 of FIGS. 2 and 3, includes the following:

Element ID field 302 identifies the Association element, as defined in Table 7-26 of 802.11-2007 protocol definition Length field 304 is set to 7+n BSSID field 306 is set to the MAC address of the AP to which the STA is currently associated (It is noted the BSSID field 306 of association element format 300 may be the same as BSSID field 206 of BSSID element format 200 of FIG. 4)

Channel field 308 is set to the channel of the association

SSID field 310 is set to the SSID of the association. The Service Set Identifier, SSID, is the human readable name of the network.

In one aspect, a Service Set Identifier specifies a particular 802.11 wireless network, either local or enterprise. Adding a BSSID element 142/144 or an Association element 150/152 to the Probe Request/Response 130/132 may need to be defined at the WiFi Alliance (WFA), for example as part of the WFA TDLS specification, since regular 802.11 STAs do not send Probe Responses, and the Probe Requests are destined only for APs, e.g. AP 102 (not for other STAs, e.g. STA 104 or 106). In P2P mode, which is defined entirely within the WFA, STAs sending Probe Requests/Response frames to other STAs are part of the P2P discovery. The TDLS capability bit, e.g. as referred to above with regard to TDLS capability indication 118 or 119, is to be defined by the Institute of Electrical and Electronics Engineers (IEEE) since the TDLS capability bit requires the definition of a bit inside a field that is controlled by the IEEE.

It should be understood that although capability element 134 and 136, BSSID element 142 and 144, and association element 150 and 152 are described with reference to probe request 130 and probe response 132, respectively, these elements may also be present in discovery request 112 and discovery response 116 of FIG. 1. In other words, discovery request 112 and discovery response 116 of FIG. 1 may include one or more of capability element 134 and 136, BSSID element 142 and 144, or association element 150 and 152 in a TDLS discovery process that is not associated with a P2P discovery process.

In one example, if a discovered STA, e.g. STA 106 of FIG. 1, indicates that it is currently associated with an AP, e.g. AP 102 of FIG. 1, and the scanning STA, e.g. STA 104 of FIG. 1, is capable of associating with that AP, the scanning STA may associate with the AP and form a TDLS direct link, e.g. link 109 of FIG. 1, with the discovered STA, rather than start a P2P network with the discovered STA. Advantages of forming a TDLS direct link 109 are that concurrent access with the AP is likely to be easier, and there is no need to enter new credentials, in order to connect to the discovered STA (because the credentials for the AP were available at the scanning STA).

In one aspect, a scanning STA that wants to connect to a discovered STA which is associated with an AP has two options. A first option is to start a P2P network with the discovered STA. The P2P network may be started on the same channel as is used for the association with the AP, to simplify concurrent operation by the discovered STA. A second option is that the scanning STA associates to the AP and then sets up a TDLS direct link with the discovered STA. When the scanning STA has credentials for the AP, this process will require no user interaction. When the scanning STA does not have security credentials for the AP, this process will include the user/STA associating with the AP, either by entering the security credentials, or by push-button configuration, etc. One skilled in the art would understand that many techniques for establishing security credentials can be used without affecting the spirit or scope of the present disclosure.

In another aspect, if the scanning STA is currently associated with the same AP as the discovered STA, the scanning STA may be able to communicate through the AP (since most APs allow their associated STAs to communicate peer-to-peer). In one aspect, whether direct STA-to-STA communication is possible can be tested by sending a TDLS discovery frame, e.g. discovery request 112 of FIG. 1, to the discovered STA, through the AP. For example, the discovered STA sends a TDLS discovery response, e.g. discovery response 116 of FIG. 1, when it receives the discovery request. In one example, peer discovery component 108 of the scanning STA of FIG. 1 may maintain a timer corresponding to the transmission of discovery request 112, and when a response timeout occurs, e.g. when the timer expires, the scanning STA assumes that STA-to-STA communications are blocked by the AP. In another aspect, the type of security of the link 109 between the STA and the AP may be indicated in the Association Element, e.g. in association element 150 or 152 in FIGS. 2 and 3.

Figure 6:
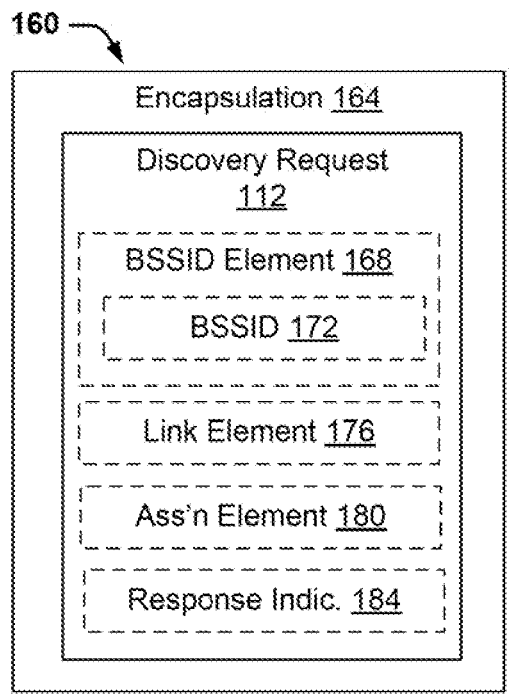
FIG. 6 is a block diagram of an aspect of an encapsulated discovery request that may be used in an aspect of the system of FIG. 1.
Figure 7:
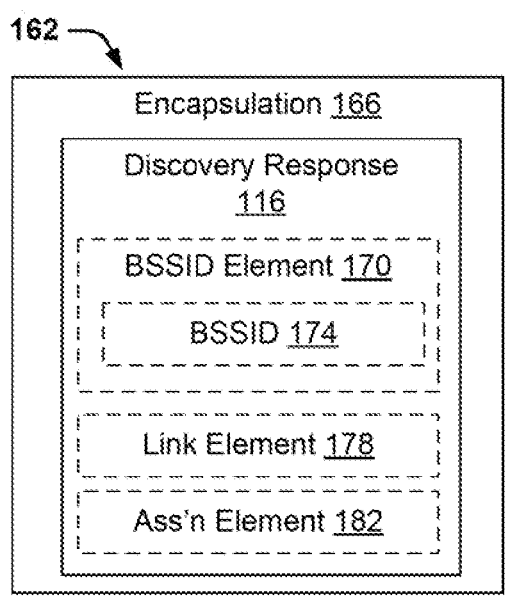
FIG. 7 is a block diagram of an aspect of an encapsulated discovery response that may be used in an aspect of the system of FIG. 1.

Referring to FIGS. 6 and 7, in one aspect, peer discovery component 108 (FIG. 1) may be configured to generate and transmit encapsulated discovery request 160 and/or encapsulated discovery response 162. For example, encapsulated discovery request 160 and encapsulated discovery response 162 correspond to discovery request 112 and discovery response 116, respectively, each contained within an encapsulation 164 and 166, respectively. For example, in an aspect, encapsulation 164 and 166 may be a message or frame format that allows discovery request 112 and discovery response 116 to be transparently transmitted through another STA, such as through access point 102 of FIG. 1. For instance, encapsulation 164 and 166 may include, but is not limited to a layer 2 (L2) encapsulation. Accordingly, encapsulated discovery request 160 and encapsulated discovery response 162 define two new TDLS frames for the purpose of TDLS discovery.

In one aspect, the encapsulated TDLS discovery request/response frames 160 and 162 may include at least a respective Basic Service Set Identifier (BSSID) element 168 and 170, which identifies a respective BSSID 172 and 174 of the Media Access Control (MAC) address of the AP to which the STA sending the TDLS discovery request frame 160 or discovery response frame 162 is associated. It is noted that BSSID element 168 and 170 may have the same format as BSSID element format 200 of FIG. 4, and/or may be the same as BSSID elements 142 and 144 of FIGS. 2 and 3, respectively.

Figure 8:
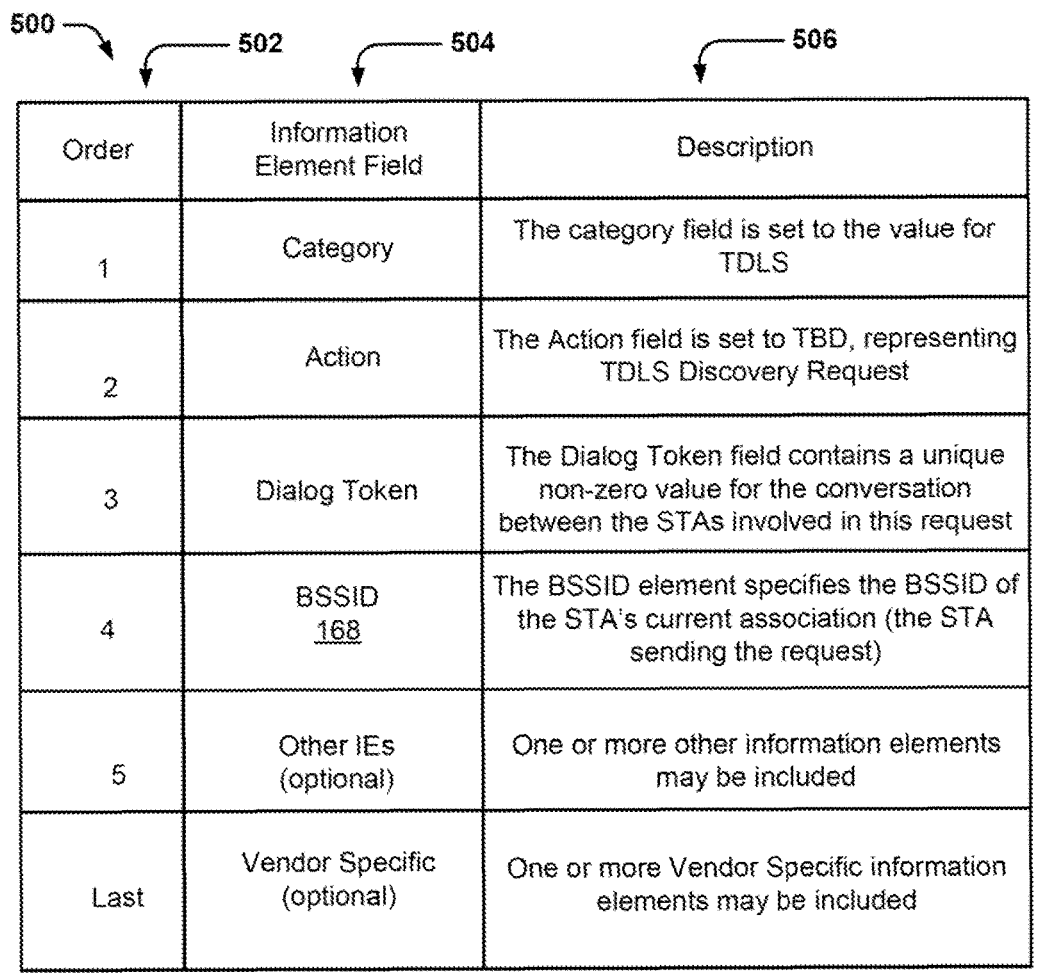
FIG. 8 is table of an aspect of elements of a format of a TDLS discovery request frame with a Basic Service Set Identifier (BSSID) element that may be used in an aspect of the system of FIG. 1.
Figure 9:
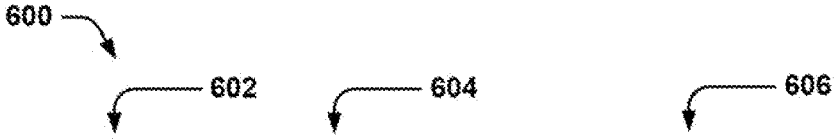
FIG. 9 is table of an aspect of elements of a format of a TDLS discovery response frame with a Basic Service Set Identifier (BSSID) element that may be used in an aspect of the system of FIG. 1.

FIG. 8 illustrates an example of encapsulated TDLS discovery request frame format 500, such as may be used for encapsulated TDLS discovery request frame 160, including Basic Service Set Identifier (BSSID) element 168. Further, encapsulated TDLS discovery request frame format 500 may include various other information elements 504, as described at 506, and which may be ordered as indicated at 502. And, FIG. 9 illustrates an example TDLS discovery response frame format 600, such as may be used for encapsulated TDLS discovery response frame 162, including Basic Service Set Identifier (BSSID) element 170. Further, encapsulated TDLS discovery response frame format 600 may include various other information elements 604, as described at 606, and which may be ordered as indicated at 602.

Referring back to FIGS. 6 and 7, instead of respective BSSID elements 168 and 170, the existing Link Identifier element 176 and 178 as defined in 802.11z may be respectively included in the encapsulated TDLS discovery request and response frames 160 and 162.

Figure 10:
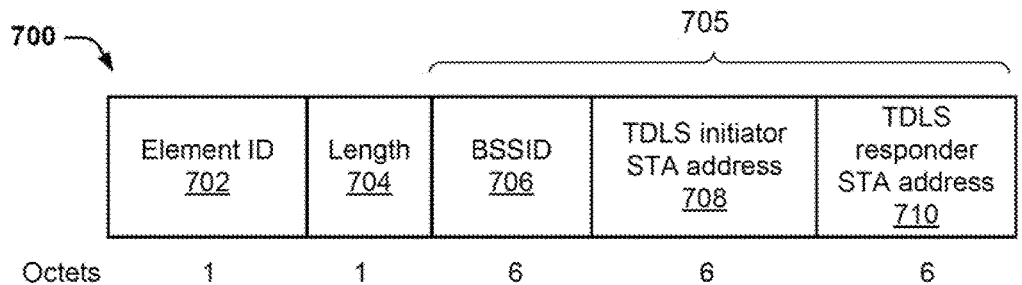
FIG. 10 is a block diagram of an aspect of a Link Identifier element that may be used in an aspect of the system of FIG. 1.

FIG. 10 illustrates an example of a Link Identifier element format 700, such as may be used for Link Identifier element 176 and 178 of FIGS. 6 and 7, with the following definitions: element ID 702 that identifies the link identifier element; length field 704 that identifies a length, e.g. which may be set to be 18; and address fields 705, such as but not limited to, a BSSID field 706 (which may be the same as or similar to previously discussed BSSID fields), a TDLS initiator STA Address field 708, and a TDLS responder STA address 710, which may be set depending on whether the element is included in a discovery request or in a discovery response.

Figure 11:
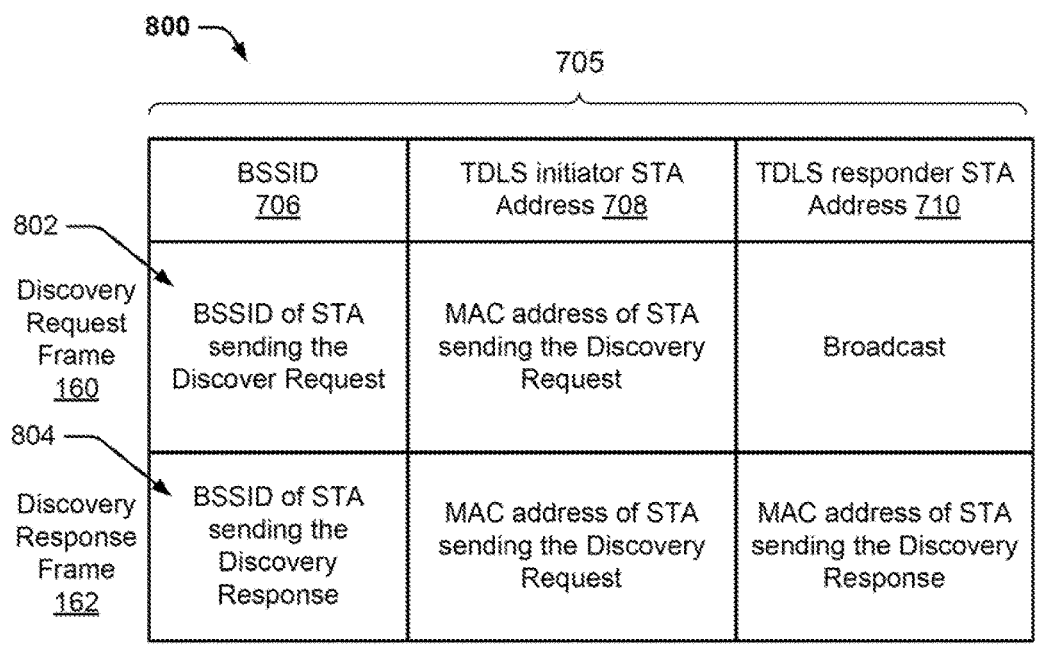
FIG. 11 is a table of an aspect of contents of Link identifier fields that may be included in a discovery request and a discovery response frame used in an aspect of the system of FIG. 1.

FIG. 11 is a table 800 that includes example contents 802 and 804 of Link Identifier address fields 705 included in encapsulated discovery request frame 160 and encapsulated discovery response frame 164 of FIGS. 6 and 7.

FIG. 12 illustrates an example TDLS discovery request frame format 900, such as may be used for encapsulated discovery request frame 160 of FIG. 6, including Link Identifier element 176. Further, encapsulated TDLS discovery request frame format 900 may include various other information elements 904, as described at 906, and which may be ordered as indicated at 902.

Also, FIG. 13 illustrates an example TDLS discovery response frame format 1000, such as may be used for encapsulated discovery response frame 162 of FIG. 7, including a Link Identifier element 178. Further, encapsulated TDLS discovery response frame format 1000 may include various other information elements 1004, as described at 1006, and which may be ordered as indicated at 1002.

Referring back to FIGS. 6 and 7, in one aspect, encapsulated discovery request frame 160 and encapsulated discovery response frame 162 each may include a respective association element 180 and 182, which includes other information regarding a current association of the respective STA. For example, association element 180 and 182 may include information such as, but not limited to, the type of security (e.g. security type) on the link with the AP, the operating channel, the operating channel bandwidth, the current PHY rate from the AP, the current PHY rate to the AP, etc. It is noted that association element 180 and 182 may be the same as, or similar to, association element 150 and 152 of FIGS. 2 and 3.

Figure 14:
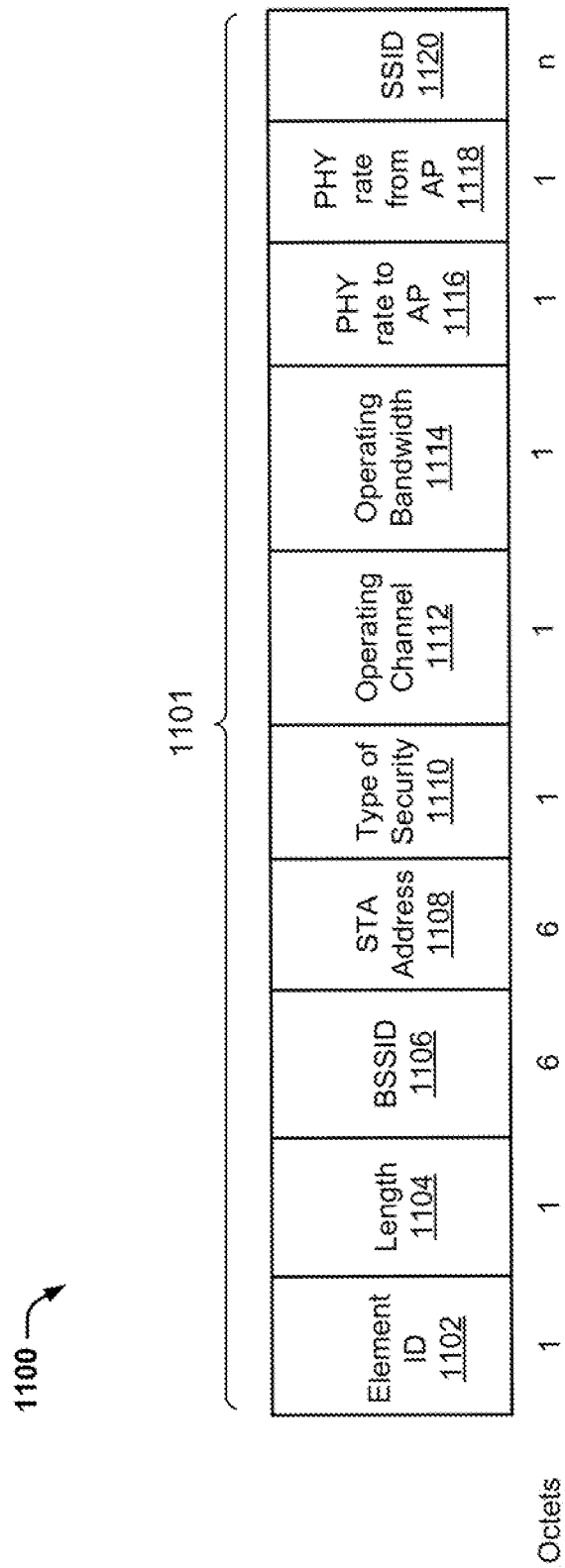
FIG. 14 is a block diagram of an aspect of an Association Element, which contains information about the current association of a device, and which may be used in an aspect of the system of FIG. 1.

FIG. 14 illustrates an example of an Association Element format 1100, which contains information about the current association of a device. For example, association element format 1100 may include one or more information elements 1101 including, but not limited to, one or more of an element ID field 1102, a length field 1104, a BSSID field 1106 (which may be the same as or similar to the previously discussed BSSID fields), a STA address field 1108, a type of security field 1110, an operating channel field 1112, an operating bandwidth field 1114, a PHY rate to AP field 1116, a PHY rate from AP field 1118, and an SSID field 1120.

In one aspect, information elements 1101 that are related to device type discovery or service discovery (including vendor specific elements) are added to the discovery frames. The TDLS discovery request/response frames 160 and 162 (FIGS. 6 and 7) may include some or all of the information elements 1101 that would typically be included in a Probe Request/Response frame as transmitted by a STA. STAs only transmit Probe Response frames when they operate as a P2P device.

In one aspect, the TDLS discovery request frame 160 (FIG. 6) is transmitted to a broadcast address, so that any device in the network layer 2 domain can receive it. Devices in the same network layer 2 domain could be devices associated with the AP, but also devices connected through the wired interface of the AP and wireless devices that are associated with another AP.

In another aspect, STAs that receive a TDLS discovery request frame 160 (FIG. 6) and are TDLS capable may respond with the TDLS discovery response frame 162 (FIG. 7). A TDLS discovery response frame 162 may not be transmitted when the BSSID 172 (or, another BSSID value from one of the other elements that may be included in discovery request 160) indicated in the TDLS discovery request frame 160 does not match its own BSSID 174 (or, another BSSID value from one of the other elements that associated with discovery response 160 or the responding STA). The 802.11z protocol currently does not allow a TDLS direct link 109 (FIG. 1) to be set up between STAs that are associated with different BSSIDs. Thus, referring back to FIG. 6, the TDLS discovery request 160 may include an indication 184 of whether a response should be sent or not in case of a non-matching BSSID.

In another aspect, the channel 1012 of the current association is included in the TDLS discovery request/response 160 or 162. When the channels are the same, this indicates that the STAs can set up a TDLS direct link 109 (FIG. 1) even when the BSSIDs, e.g. 172 and 174, are different. In another aspect, the TDLS discovery request frame is sent immediately after associating with an AP. The TDLS discovery request frame may be sent at regular intervals, for instance, once per minute. The TDLS discovery request frame may be sent to a unicast address. A TDLS discovery request frame may be sent to a unicast address (A1=BSSID, A2=STA address, A3=unicast address). The unicast address to which a TDLS discovery request frame is transmitted may be obtained after a MAC Service Data Unit (MSDU) has been transmitted to or received from this address.

In another aspect, the TDLS capability indication 118 or 119 (FIG. 1) is implied by receiving a TDLS discovery request frame 160 or response frame 162. But, similar to the disclosure above with respect to FIGS. 2 and 3, a specific TDLS capability element, e.g. capability element 134 or 136, may be included in the TDLS discovery request/response 112/116, including the encapsulated TDLS discovery request/response 160/162. For example, the TDLS capability may be signaled as part of an Extended Capability element that is included in the TDLS discovery request/response.

In another aspect, information elements that are contained in the TDLS setup request/response frames are also contained in the TDLS discovery request/response frames. For the purpose of discovery, in one example, the TDLS setup rules are modified as follows: A TDLS setup request frame is transmitted to the Broadcast address, which designates the frame as a discovery frame (e.g. the transmitting of a TDLS setup request frame to a group address designates the setup request frame as a discovery frame). When receiving a broadcast TDLS setup request frame, a device that supports TDLS responds with a unicast TDLS setup response frame. In an aspect, a TDLS setup confirm frame may not be transmitted in response to a received TDLS setup response frame that responded to the broadcast TDLS setup request frame. Setup requests and corresponding responses can be matched using a dialog token, e.g. a token used to identify messages relating to the same dialog or message exchange. Reusing the TDLS setup frames for discovery eliminates the need to define new frames within the 802.11z protocol.

When the TDLS setup request frame is used for TDLS discovery, the start of a direct link may be initiated by sending a TDLS setup confirm frame (in which case the confirm frame is the only frame needed to start the direct link). Either STA (either requester or responder) may transmit a TDLS setup confirm frame in order to activate the TDLS direct link. However, a TDLS setup confirm frame does not have to be transmitted between two TDLS-capable STAs after TDLS discovery, because the TDLS STAs may never actually exchange any data. In one aspect, the state for all received broadcast TDLS setup requests and associated TDLS setup responses are stored at the STAs.

Accordingly, when the TDLS setup request and the TDLS setup response frames are used for discovery, it may be necessary to send another TDLS setup request frame (and possibly a corresponding TDLS setup response frame and a TDLS setup confirm frame) to actually set up a direct link. This reduces the burden of having to keep track of the capabilities of all STAs from which a received a TDLS setup request/response frame was received that was part of a TDLS discovery exchange.

Further, in an aspect, potential TDLS peer STAs can be discovered by sending a broadcast discovery request, wherein the discovery request information is encapsulated in a layer 2 (L2) encapsulation. Additionally, for example, in one aspect, the discovery responses are sent to the unicast address of the requesting STA, wherein the discovery information is also encapsulated in the L2 encapsulation.

Figure 15:
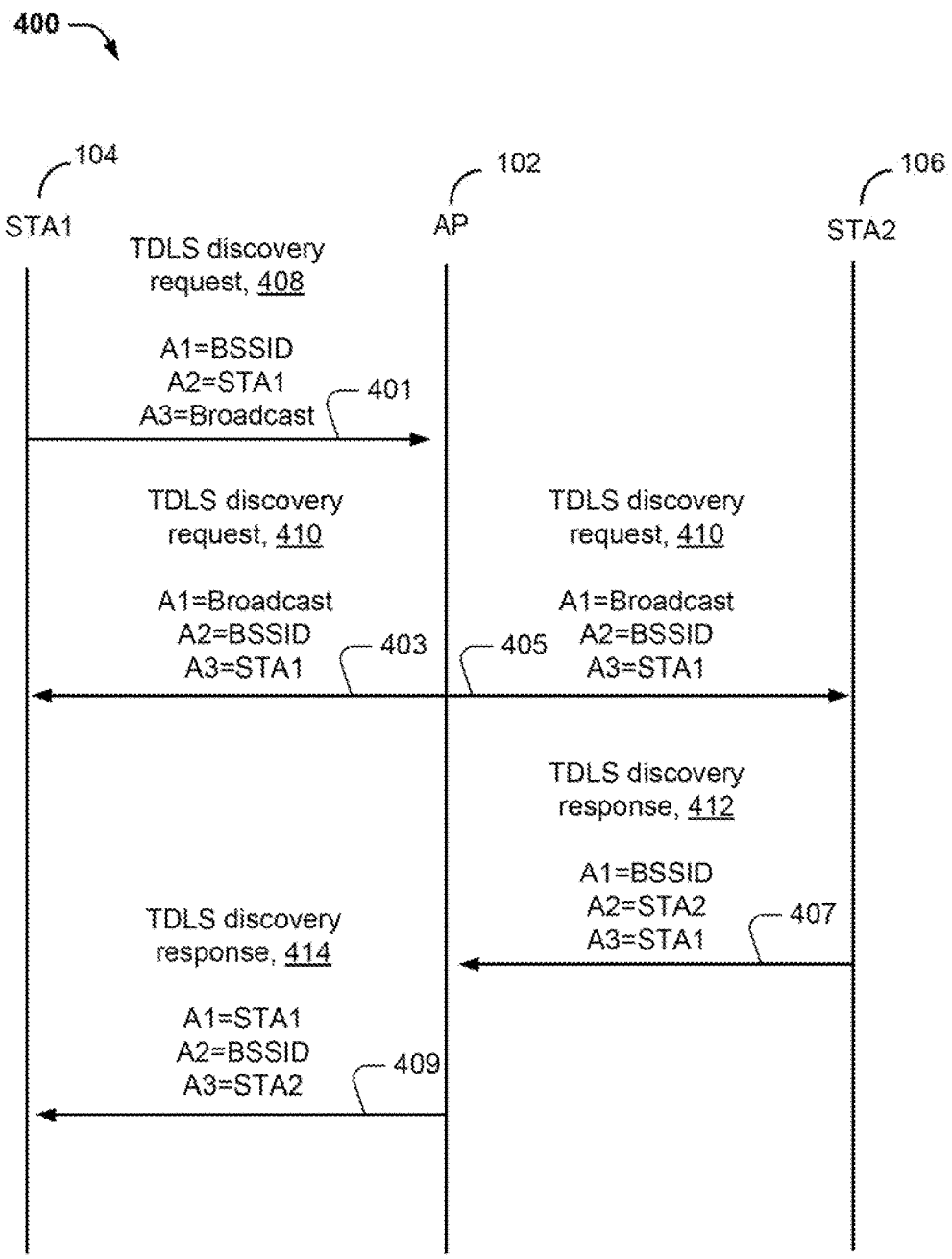
FIG. 15 is a message flow diagram of an aspect of a method of Tunneled Direct Link Setup (TDLS) discovery exchange.

FIG. 15 illustrates an example flow diagram of a TDLS discovery exchange 400. In the example, TDLS discovery exchange 400 is based on the newly defined TDLS discovery and response frames 160 and 162 (FIGS. 6 and 7). At 401, STA1 104 transmits a broadcast TDLS discovery request frame 408 to the AP 102, including address information A1=BSSID, A2=STA1, and A3=Broadcast. At 403 and 405, the AP 102 forwards the TDLS discovery request frame 410 to the broadcast address, e.g. A1=Broadcast, A2=BSSID, A3=STA1. STA2 106 receives the broadcast TDLS discovery request frame 410 from the AP 102. STA2 106 is TDLS capable and, at 407, responds with a TDLS discovery response frame 412, with address information A1=BSSID, A2=STA2, A3=STA1. In other words, STA2 106 includes in the response frame 412 at least its current BSSID, and possibly other information regarding its current association or its capabilities (such as a device type or a device type element). At 409, the AP 102 forwards the response frame 414 to STA1 104, with address information A1=STA1, A2=BSSID, A3=STA2. The response frame 414 is received by STA1, which subsequently adds STA2 106 to the list of TDLS capable peer STAs. The BSSID included inside the payload of the TDLS discovery response 414 is the same as the BSSID to which STA1 104 is associated.

Figure 16:
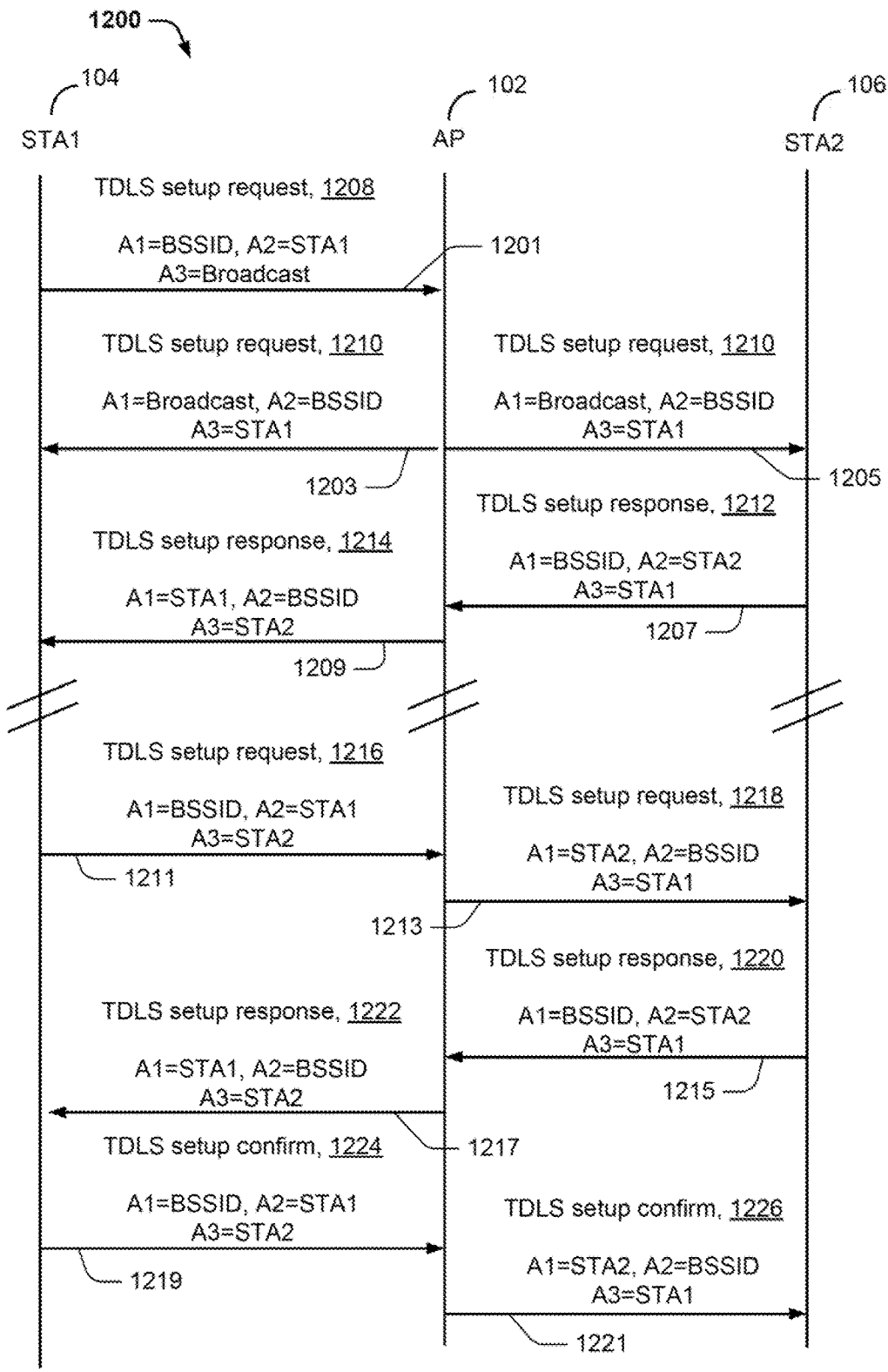
FIG. 16 is a message flow diagram of an aspect of TDLS discovery based on a broadcast TDLS setup request, followed by a TDLS setup that starts with a unicast TDLS setup request.

FIG. 16 illustrates an example flow diagram of a TDLS discovery message flow 1200 based on a broadcast TDLS setup request, followed by a TDLS setup that starts with a unicast TDLS setup request. At 1201, STA1 104 transmits a broadcast TDLS setup request frame 1208 to the AP 102, including address information A1=BSSID, A2=STA1, and A3=Broadcast. At 1203 and 1205, the AP 102 forwards the TDLS setup request frame 1210 to the broadcast address, e.g. A1=Broadcast, A2=BSSID, A3=STA1. STA2 106 receives the broadcast TDLS setup request frame 1210 from the AP 102. STA2 106 is TDLS capable and, at 1207, responds with a TDLS setup response frame 1212, with address information A1=BSSID, A2=STA2, A3=STA1. At 1209, the AP 102 forwards the setup response frame 1214 to STA1 104, with address information A1=STA1, A2=BSSID, A3=STA2. The setup response frame 1214 is received by STA1.

At 1211, STA1 104 transmits a unicast TDLS setup request frame 1216 to the AP 102, including address information A1=BSSID, A2=STA1, and A3=STA2, based on the TDLS response frame 1214 received at 1209. At 1213, the AP 102 forwards the TDLS setup request frame 1218 to the unicast address, e.g. A1=STA2, A2=BSSID, A3=STA1. STA2 106 receives the unicast TDLS setup request frame 1218 from the AP 102. At 1215, STA2 106 responds with a TDLS setup response frame 1220, with address information A1=BSSID, A2=STA2, A3=STA1. At 1217, the AP 102 forwards the setup response frame 1222 to STA1 104, with address information A1=STA1, A2=BSSID, A3=STA2. The setup response frame 1222 is received by STA1, and at 1219 STA1 transmits a TDLS setup confirm frame 1224, with unicast address A1=BSSID, A2=STA1, A3=STA2. At 1221, AP 102 forwards setup response frame 1224, with address A1=STA2 , A2=BSSID, A3=STA1, to STA2 for setting up a TDLS link.

In one aspect, a TDLS setup request frame that is received from a broadcast or multicast address may be interpreted as part of a TDLS discovery exchange, which implies that the information elements contained in it do not have to be stored at the receiver(s), except temporarily for the purpose of generating the corresponding TDLS setup response frame. In another aspect, to further indicate that the TDLS setup request frame is part of a discovery exchange and not part of a setup exchange, a TDLS discovery element may be included in the TDLS setup request frame, or a predefined Dialog Token value may be used in the TDLS setup request frame.

In another aspect, the TDLS discovery frames may include one or more device type elements that indicate a primary and/or secondary purpose of the device. Examples of device types include, but are not limited to, computer, input device (e.g., mouse, keyboard, etc.), display, camera, smartphone, etc. A TDLS discovery response may be transmitted only when a requested device type as present in the discovery request matches the device type at the receiving STA.

In one example, the determination of which information elements are included in a TDLS Setup Request frame and a TDLS Setup Response frame may be by whether they are used for TDLS discovery or used for TDLS link setup. In one aspect, for TDLS discovery, a Probe Request frame may be encapsulated in the TDLS Ethertype, and transmitted to the broadcast address or a unicast address. In addition to the regular information elements, the Probe Request may contain a Link Identifier, which specifies the MAC address of the transmitter STA and the BSSID. Other association parameters may be included also, such as the channel of the association, the current PHY rate from the AP, the type of security on the link with the AP, etc. The received Probe Responses will indicate whether the STA is TDLS capable through the Extended Capability element, or the TDLS capability may be inferred because the STA was able to parse the encapsulated Probe Request and respond with an encapsulated Probe Response. The Probe Response may contain a Link Identifier element that contains the TDLS initiator STA address, the BSSID of the TDLS responder STA, and the TDLS responder STA address. In one example, the Probe Response is encapsulated in a TDLS frame. One skilled in the art would understand that the association parameters listed herein are not exclusive and that others not mentioned herein may be included without affecting the scope or spirit of the present disclosure.

Figure 17:
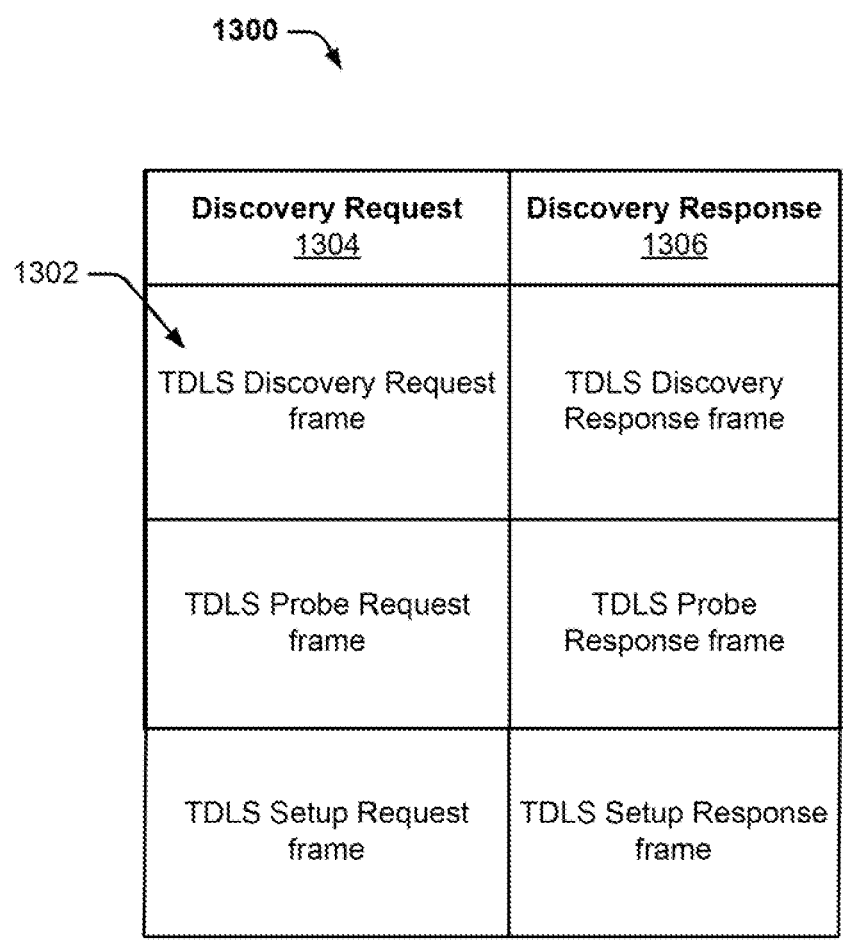
FIG. 17 is a table of an aspect of a format of possible frames used in a TDLS discovery.

FIG. 17 is a table 1300 including examples of possible frames 1302 used in a TDLS discovery, e.g. a TDLS discovery request 1304 or a TDLS discovery response 1306. In one example, all the frames use the TDLS encapsulation, or any other L2 encapsulation based on a proprietary Sub-network Access Protocol Organizationally Unique Identifier (SNAP OUI), a proprietary. Ethertype with SNAP OUI 000000h, or any encapsulation layer on top of an Ethertype. SNAP is a 802.11 protocol for extending the Service Access Point field to specify more protocols. In one aspect, the Discovery Request is sent to the broadcast address (e.g., unicast to the AP, then broadcast by the AP), and the Discovery Response is sent to the unicast source address of the STA that transmitted the Discovery Request. In one example, two new TDLS frames, e.g. the encapsulated TDLS discovery request and response frames 160 and 162 (FIGS. 6 and 7), are defined.

As previously discussed, both of these frames may contain an information element that identifies the STA transmitting the frame and it's BSSID. Other elements may be included as well. In one example, a TDLS Discovery Request is transmitted to the broadcast address after association to an AP. The received TDLS Discovery Response is then stored in a list of TDLS capable peer STAs. Information from the TDLS Discovery Request may also be stored in this list. In one example, a TDLS direct link is set up when traffic is exchanged with STAs in this list, or when a WiFi Display (WFD) link is set up with one of the STAs in this list.

TDLS direct links may be set up with multiple STAs in one setup, for example, by sending a broadcast TDLS Setup Request frame, receiving one or more TDLS Setup Response frames, and responding with a TDLS Setup Confirm frame to STAs with which a TDLS Direct Link should be set up. This may include all the STAs that sent a TDLS Setup Response. Group-wise TDLS direct link setup may combine TDLS discovery with TDLS link setup.

TDLS discovery through the AP does not yield information about the current distance between the potential peer STAs, which requires a frame exchange directly between the STAs. in a direct frame exchange, it is not known when the other STA is in the "awake" state because the other STA maybe in a power save mode and not awake. Thus, to circumvent this issue, the TDLS discovery request frame may indicate that the TDLS discovery response frame may be transmitted directly to the requesting STA.

Figure 18:
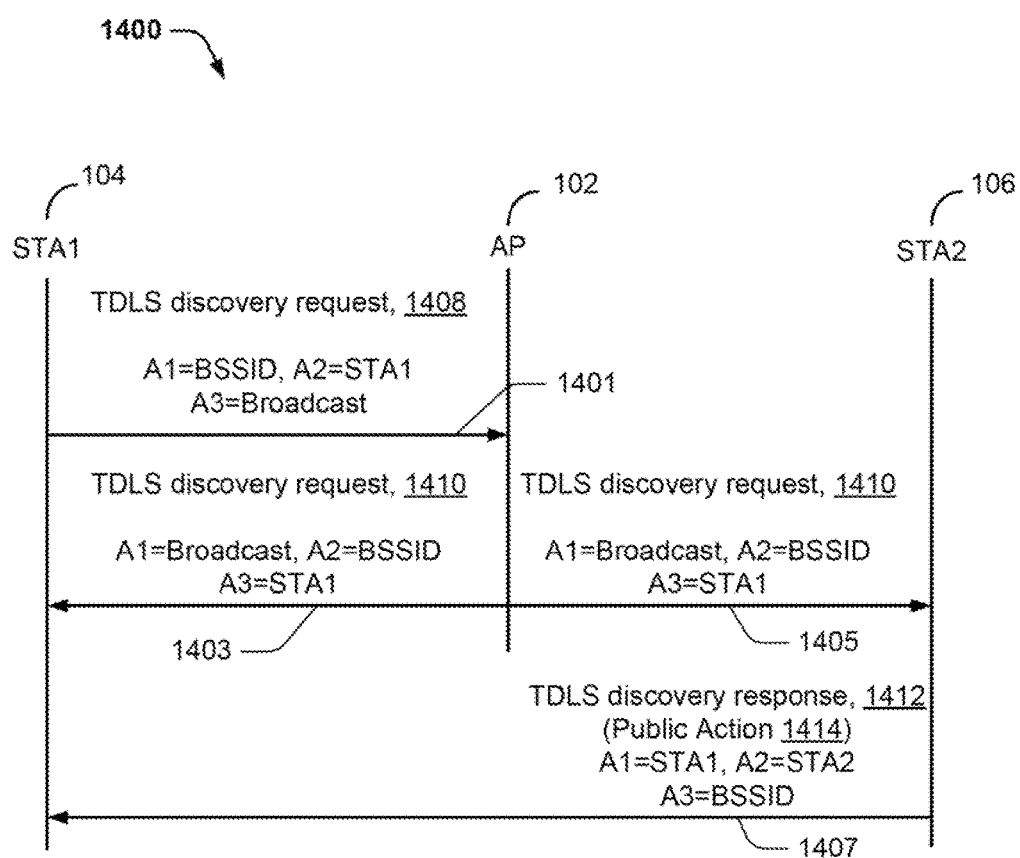
FIG. 18 is a message flow diagram of an aspect of a Broadcast discovery request with a direct discovery response.

FIG. 18 illustrates an example flow diagram 1400 showing a Broadcast discovery request with a direct discovery response. At 1401, STA1 104 transmits a broadcast. TDLS discovery request frame 1408 to the AP 102, including address information A1=BSSID, A2=STA1, and A3=Broadcast.

The requesting STA, e.g. STA1, stays in active mode for some time after sending the request. The duration of the awake time may be indicated inside the request frame, for instance with reference to the Timing Synchronization Function (TSF). In one aspect, the TSF is a timing synchronization messaging system where each participating STA exchanges beacon frames. A start time of the awake time may be indicated as well. STAs that are associated with the same AP share the same timing reference, or TSF. When the indicated awake time has expired, the responding STA can send a discovery response through the AP, or it may send no response at all. When the response is sent through the AP, the STA sending the response may include an indication why it was unable to send the response directly. The requesting STA may in this case follow up with a unicast discovery request.

At 1403 and 1405, the AP 102 forwards the TDLS discovery request frame 1410 to the broadcast address, e.g. A1=Broadcast, A2=BSSID, A3=STA1. STA2 106 receives the broadcast TDLS discovery request frame 1410 from the AP 102. STA2 106 is TDLS capable.

At 1407, STA2 responds with a direct transmission of TDLS discovery response frame 1412, with address information A1=BSSID, A2=STA2, A3=STA1, and optionally with a direct transmission indicator information element 1414, such as a public action type, to STA1. The response frame 1412 is received by STA1, which subsequently adds STA2 106 to the list of TDLS capable peer STAs.

In one example, a direct response 1412 is sent only when the requesting STA is associated with the same BSSID or when it is associated on the same channel. Otherwise, the response may be sent through the AP. In one example, a direct response is retried only for a limited number of time since the requesting STA may not be reachable directly. The direct response may include channel sounding information and/or transmit power information. The direct response may also include other information elements, for example, which specify the capabilities at the responding STA.

In one example, the TDLS discovery request frame 1412 includes direct transmission indicator information element 1414 that indicates if the response frame must be transmitted through the AP or through a direct path. In one aspect, the TDLS discovery response frame 1412 transmitted over the direct path is a management frame of subtype Public Action. Public Action frames (as defined in IEEE P802.11 rev mb) are received by STAs also when no association or direct link exists between the sender and the receiver of the frame. Hence, the designation "public". A scanning STA may transmit multiple broadcast TDLS discovery request frames, e.g. 1408, to increase the probability that STAs which skip Delivery Traffic Indication Map (DTIM) beacons may receive them. Some STAs skip the DTIM beacons to increase sleep time and reduce the standby power consumption.

In one example, the STA transmits a broadcast TDLS discovery request frame 1408 after association or after a refresh option, to provide a recent list of nearby devices that had been selected at the STA. The received TDLS discovery response frame 1412 indicates which STAs can be reached through the AP, or which STAs are actually nearby, when the response is sent directly.

Figure 19:
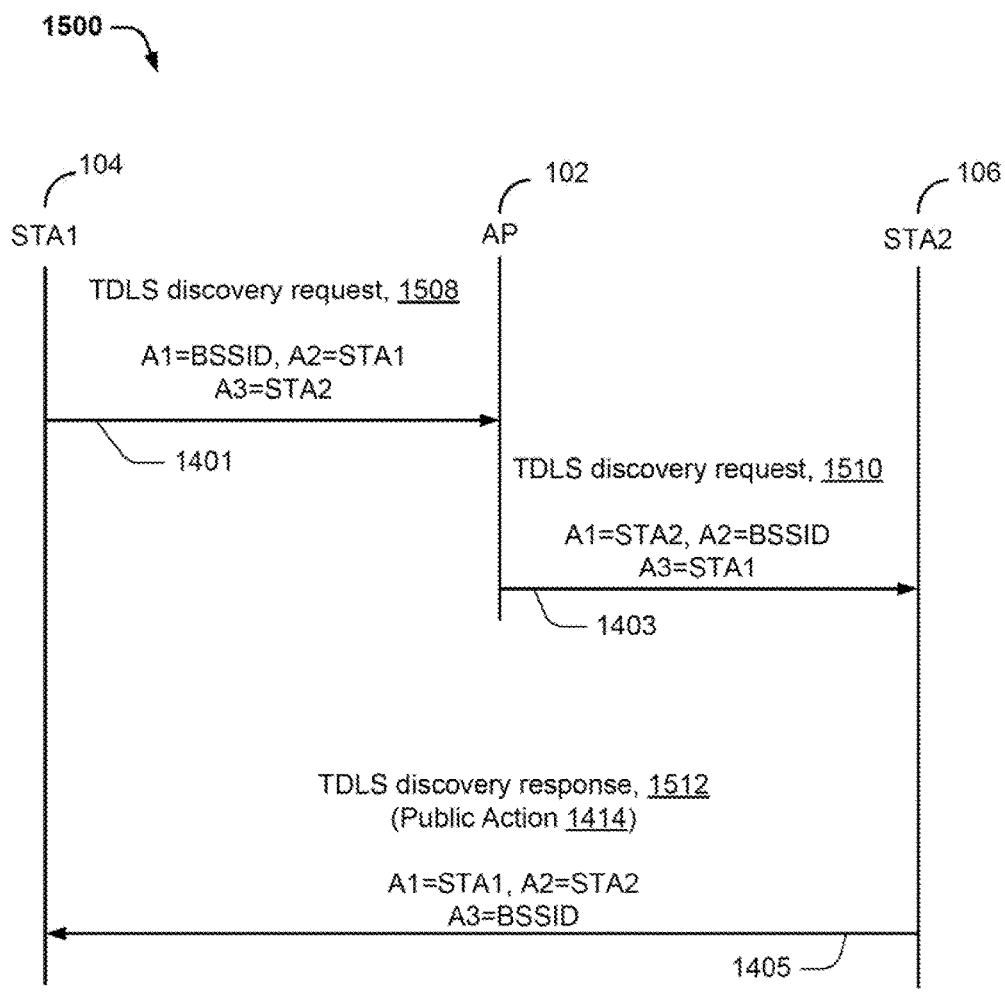
FIG. 19 is a message low diagram of an aspect of a Unicast discovery request with a direct response.

FIG. 19 illustrates an example of a message exchange 1500 including a Unicast discovery request to one or more selected target STAs, with a direct response. In one example, the target STAs are selected from a list obtained after receiving a discovery response through the AP based on a previously transmitted broadcast discovery request. At 1501, STA1 104 transmits a unicast TDLS discovery request frame 1508 to the AP 102, including address information A1=BSSID, A2=STA1, and A3=STA2, thereby directing a unicast message to STA2. At 1503, the AP 102 forwards the TDLS discovery request frame 1510 to the unicast address, e.g. A1=STA2, A2=BSSID, A3=STA1, thereby unicasting the message to STA2. STA2 106 receives the unicast TDLS discovery request frame 1510 from the AP 102. STA2 106 is TDLS capable, for example, as noted above based on a prior discovery response. Accordingly, at 1505, STA2 responds with a direct transmission of TDLS discovery response frame 1512, with address information A1=STA1, A2=STA2, A3=BSSID, and optionally with a direct transmission indicator information element 1414, such as a public action type as discussed above, to STA1. The response frame 1512 is received by STA1.

Figure 20:
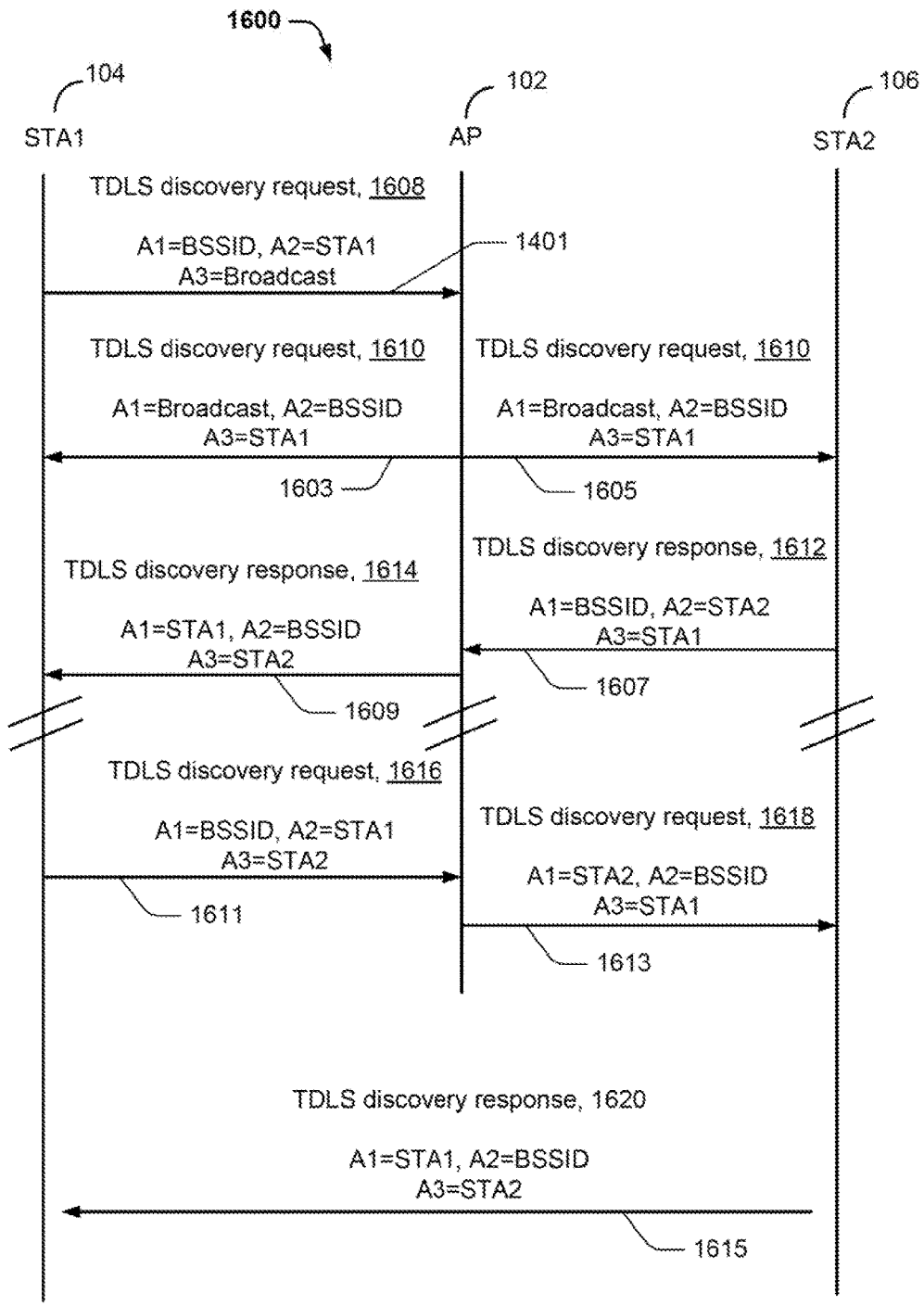
FIG. 20 is a message flow diagram of an aspect of a TDLS broadcast discovery with a response through the AP combined with unicast discovery with a direct response.

FIG. 20 illustrates an exemplary message flow 1600 including a TDLS broadcast discovery with a response through the AP combined with unicast discovery with a direct response. The TDLS discovery procedure may be based on existing Probe Request and Probe Request frames, for example, in the following way. At 1601, the TDLS Discovery Request frame 1608 encapsulates a Probe Request frame body, which is sent to the Broadcast address via the AP 102. At 1603 and 1605, AP 102 forwards the TDLS Discovery Request frame 1610, e.g. based on 1608 but with a revised address. At 1607 and 1609, the TDLS Discovery Response frame 1612 is a plain Probe Response frame, without additional encapsulation. TDLS Discovery Request frame 1608 with the Probe Request frame body and TDLS Discovery Response frame 1612 with Probe Response frame may contain a BSSID element that specifies the BSSID and the address of the STA sending the TDLS Discovery Request frame, and optionally a Channel element that indicates the channel on which the STA is currently associated with an AP. The TDLS capability is signaled by setting the appropriate capability bit in the Extended Capability element contained in the Probe Request and Probe Response frame bodies. The Probe Response may include the BSSID in the A3 field or the STA2 address.

At 1611, STA1 104 transmits a unicast TDLS discovery request frame 1616 to the AP 102, including address information A1=BSSID, A2=STA1, and A3=STA2, thereby directing a unicast message to STA2. At 1613, the AP 102 forwards the TDLS discovery request frame 1618 with new addressing, e.g. the unicast address, A1=STA2, A2=BSSID, A3=STA1, thereby unicasting the message to STA2. STA2 106 receives the unicast TDLS discovery request frame 1618 from the AP 102. STA2 106 is TDLS capable, for example, as noted above based on the prior discovery response. Accordingly, at 1615, STA2 responds with a direct transmission of TDLS discovery response frame 1620, with address information A1=STA1, A2=STA2, A3=BSSID to STA1. The response frame 1620 is received by STA1.

Figure 21:
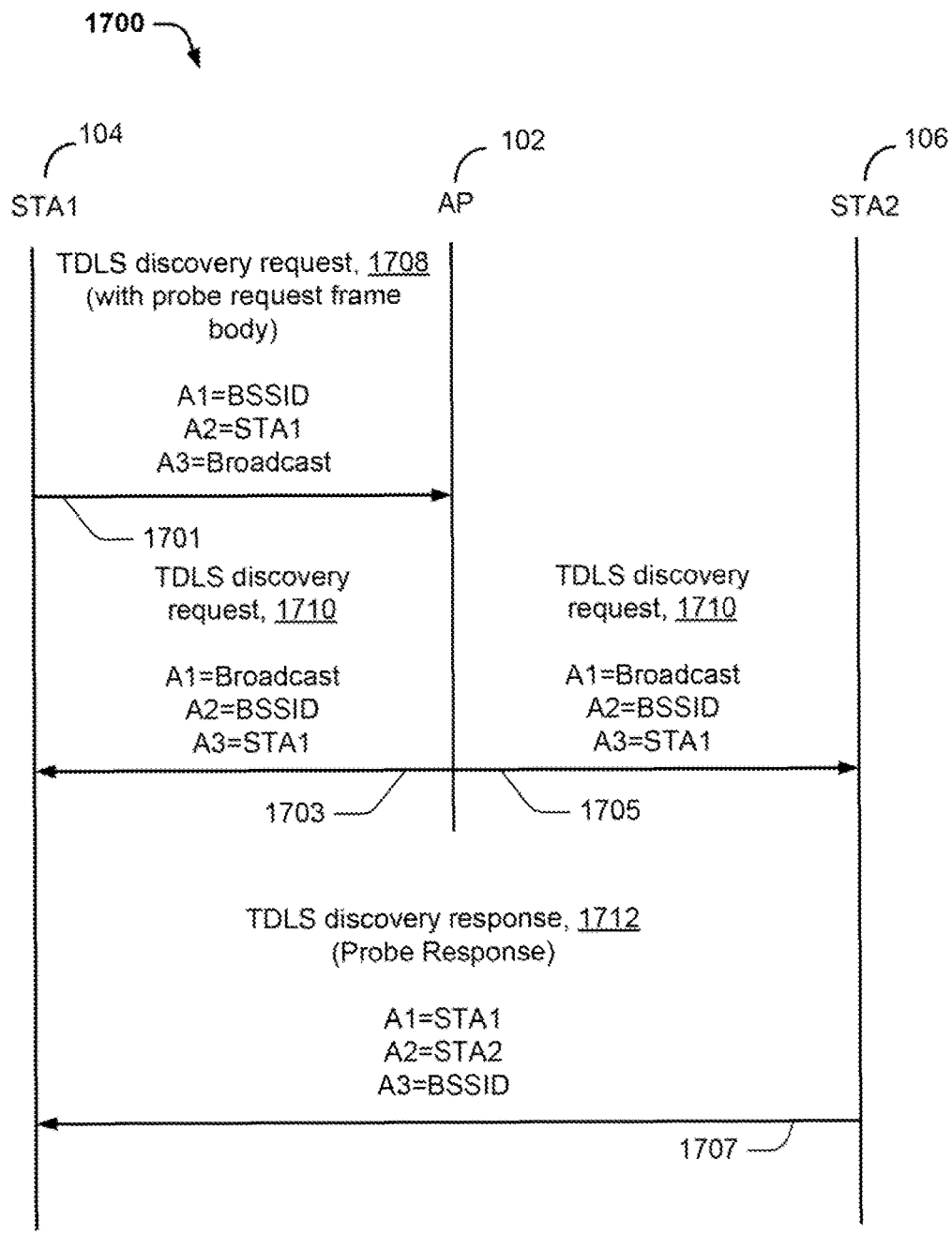
FIG. 21 is a message flow diagram of an aspect of a TDLS discovery procedure based on Probe Request and Probe Response.
Figure 22:
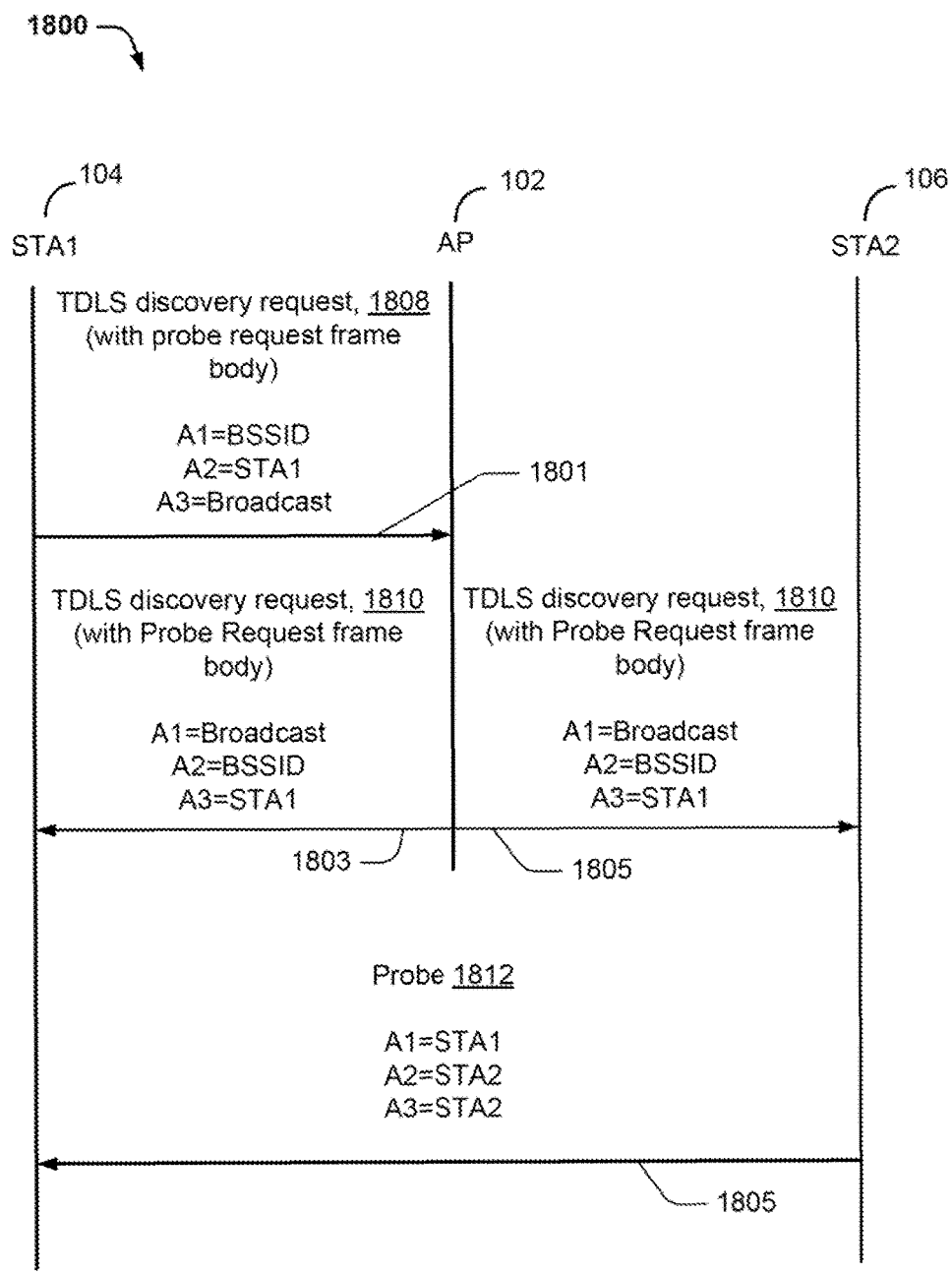
FIG. 22 is a message flow diagram of another aspect of a TDLS discovery procedure based on Probe Request and Probe Response.

Referring to FIGS. 21 and 22, example message flows 1700 and 1800 are illustrated for the TDLS discovery procedure based on Probe Request and Probe Response, respectively. An exemplary Probe Request frame body is defined in IEEE 802.11-2007, clause 7.2.3.8, and in WiFi_P2P_Technical_Specification_v1.00.pdf, clause 4.2.2. An exemplary Probe Request frame body is defined in IEEE 802.11-2007, clause 7.2.3.9, and in WiFi_P2P_Technical_Specification_v1.00.pdf, clause 4.2.3.

In FIG. 21, at 1701, the TDLS Discovery Request frame 1708 encapsulates a Probe Request frame body, to STA1 which is sent to the Broadcast address via the AP 102. At 1703 and 1705, AP 102 forwards the TDLS Discovery Request frame 1710, e.g. based on 1708 but with a revised address information A1=STA1, A2=STA2, A3=BSSID to STA1. At 1707, STA2 directly transmits to STA1, e.g. over a wireless communication link that does not include AP 102, a TDLS discovery response 1712, such as a Probe Response frame body with address information A1=STA1, A2=STA2, A3=BSSID.

In FIG. 22, at 1801, the TDLS Discovery Request frame 1808 encapsulates a Probe Request frame body, which is sent to the Broadcast address via the AP 102. At 1803 and 1805, AP 102 forwards the TDLS Discovery Request frame 1810, e.g. based on 1808 but with a revised address. At 1807, STA2 directly transmits a probe response 1812, with address information A1=STA1, A2=STA2, A3=STA2, to STA1.

Figure 23:
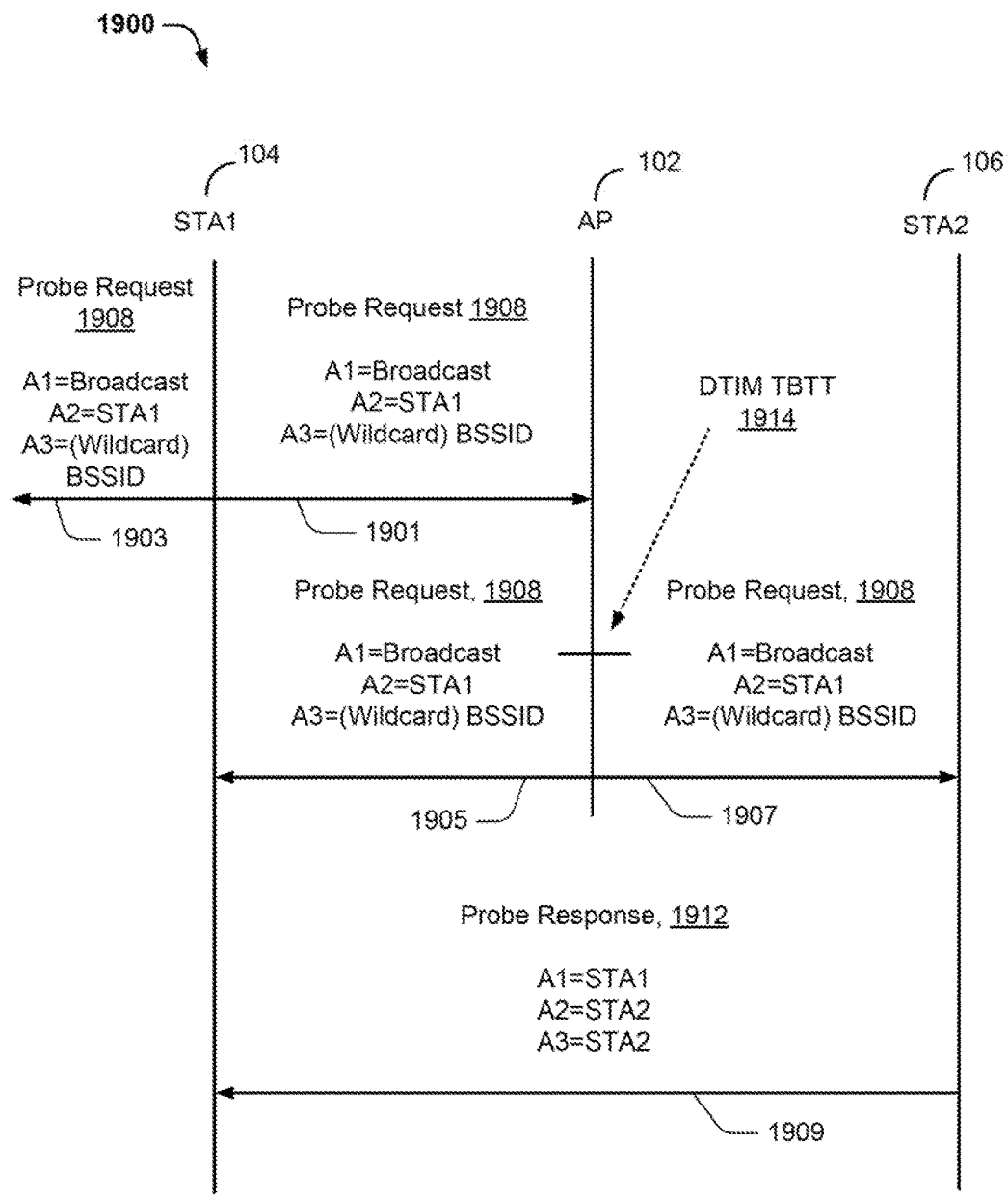
FIG. 23 is a message flow diagram of another aspect of a TDLS discovery procedure based on Probe Request and Probe Response, including echoing of the Probe Request.

Referring to FIG. 23, a message flow diagram 1900 illustrates a method of an AP facilitating P2P discovery by echoing received Probe Requests after the Delivery Traffic Indication Map (DTIM) Target Beacon Transmission Time (TBTT). The contents of the Probe Request frame may be copied without changes, including the address fields. Broadcast traffic is transmitted after the DTIM beacon when one or more STAs associated with the AP are in power save mode, which allows for P2P capable STAs to enter a power save mode while they remain discoverable by scanning P2P devices. At 1901 and 1903, STA1 transmits Probe Request frames 1908 with address information A1=Broadcast, A2=STA1, A3=a wildcard BSSID. As used herein, a "wildcard BSSID" refers to a generic BSSID used to represent all BSSIDs. In other words, the wildcard BSSID is somewhat like a broadcast address. For example, any device that receives a Probe Request with a wildcard BSSID will send a probe response, because the wildcard BSSID in the Probe Request matches the BSSID associated with the device.

After sending Probe Request frame 1908, the scanning P2P device, e.g. STA1 102, should remain listening on the channel until at least some time after the DTIM TBTTs 1914 of the APs on the channel, or for a time that typically is the time between DTIM beacons. At 1903 and 1905, AP 102 echoes the Probe Request frame 1908 to all STAs, e.g. STA1 and STA2, a time period after the DTIM TBTTs 1914 of the AP. The AP forwarding received Probe Requests 1908 (in particular those with P2P related information elements) thereby allows P2P capable devices, e.g. STA1, to enter a power save mode once associated, while they remain discoverable by other P2P devices based on the echoed Probe Requests. An AP that forwards received (P2P) Probe Requests 1908 should indicate this power save mode related information or echoing information to the associated STAs (for instance by setting a capability bit). Further, at 1909, STA2 may directly transmit Probe Response 1912, with address information A1=STA1, A2=STA2, A3=STA2, to STA1 in order to initiate establishment of communication.

Figure 24:
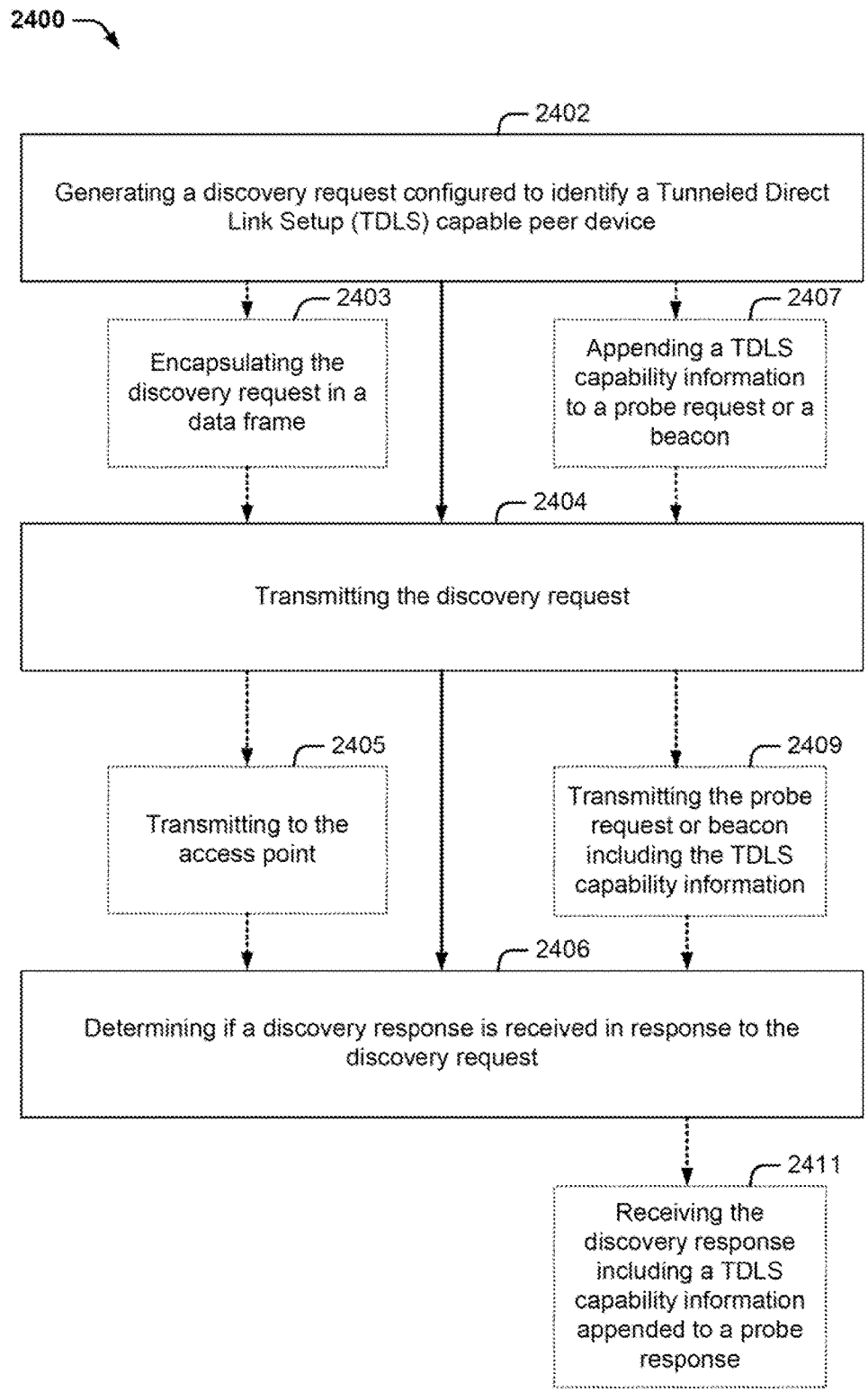
FIG. 24 is a flowchart of an aspect of a method of peer device discovery in a communications network.

Referring to FIG. 24, based on the foregoing descriptions, in an aspect, a method 2400 for performing peer device discovery in a communication network includes generating a discovery request configured to identify a Tunneled Direct Link Setup (TDLS) capable peer device (Block 2402). Further, method 2400 includes transmitting the discovery request (Block 2404). Additionally, method 2400 includes determining if a discovery response is received in response to the discovery request (Block 2406).

In an aspect of method 2400, the generating the discovery request (Block 2402) may further include encapsulating the discovery request in a data frame (Block 2403). For example, the encapsulating enables the discovery request to be transparent to an access point. Accordingly, the transmitting (Block 2404) may further include transmitting to the access point (Block 2405). For example, the access point may then forward the discovery request on to other stations associated with the access point, wherein the encapsulating allows for the access point to forward the discovery request even if the access point is not configured to understand the discovery request.

In another aspect of method 2400, the generating the discovery request (Block 2402) may further include appending a TDLS capability information to a probe request or to a beacon (Block 2407). For example, the probe request or the beacon may be based on P2P discovery. Accordingly, the transmitting (Block 2404) may further include transmitting the probe request or beacon including the TDLS capability information (Block 2409). Additionally, the determining if a discovery response is received (Block 2406) may also include receiving the discovery response including a TDLS capability information appended to a probe response (Block 2411).

Figure 25:
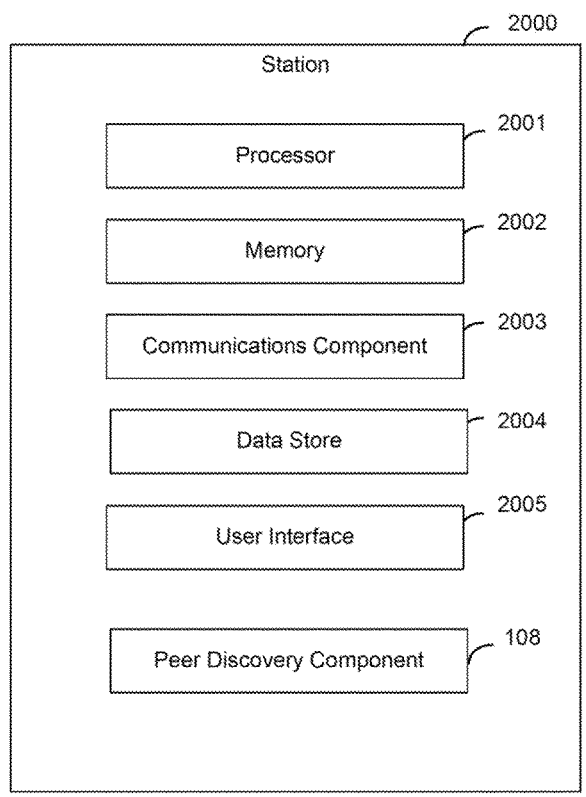
FIG. 25 is schematic diagram of an aspect of a station (STA) for performing Tunneled Direct Link Setup (TDLS) discovery in a wireless communication network.

Referring to FIG. 25, in one aspect, any of the illustrated stations STAs, e.g. STAs 102, 104, and/or 106 of FIG. 1, may be represented by station 2000. Station 2000 includes a processor 2001 for carrying out processing functions associated with one or more of components and functions described herein. Processor 2001 can include a single or multiple set of processors or multi-core processors. Moreover, processor 2001 can be implemented as an integrated processing system and/or a distributed processing system.

Station 2000 further includes a memory 2002, such as for storing local versions of applications being executed by processor 2001. Memory 2002 can include any type of memory usable by a computer, such as random access memory (RAM), read only memory (ROM), tapes, magnetic discs, optical discs, volatile memory, non-volatile memory, and any combination thereof.

Further, station 2000 includes a communications component 2003 that provides for establishing and maintaining communications with one or more parties utilizing hardware, software, and services as described herein. Communications component 2003 may carry communications between components on station 2000, as well as between station 2000 and external devices, such as devices located across a communications network and/or devices serially or locally connected to station 2000. For example, communications component 2000 may include one or more buses, and may further include transmit chain components and receive chain components associated with a transmitter and receiver, respectively, operable for interfacing with external devices.

Additionally, station 2000 may further include a data store 2004, which can be any suitable combination of hardware and/or software, that provides for mass storage of information, databases, and programs employed in connection with aspects described herein. For example, data store 2004 may be a data repository for applications not currently being executed by processor 2001.

Station 2000 may additionally include a user interface component 2005 operable to receive inputs from a user of station 2000, and further operable to generate outputs for presentation to the user. User interface component 2005 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 2005 may include one or more output devices, including but not limited to a display, a speaker, a haptic feedback mechanism, a printer, any other mechanism capable of presenting an output to a user, or any combination thereof.

Additionally, in some aspects, station 2000 may include peer discovery component 108 configured to discovery and initiate or establish a TDLS communication with another peer device, such as another station. Peer discovery component 108 includes all or some portion of the functionality described above, such as with regard to FIG. 1 as well as the other various aspects described with regard to the various message flow diagrams included herein. For example, FIGS. 4, 12, and 14-19 illustrate various implementations for generating such discovery requests and for determining such discovery responses.

Figure 26:
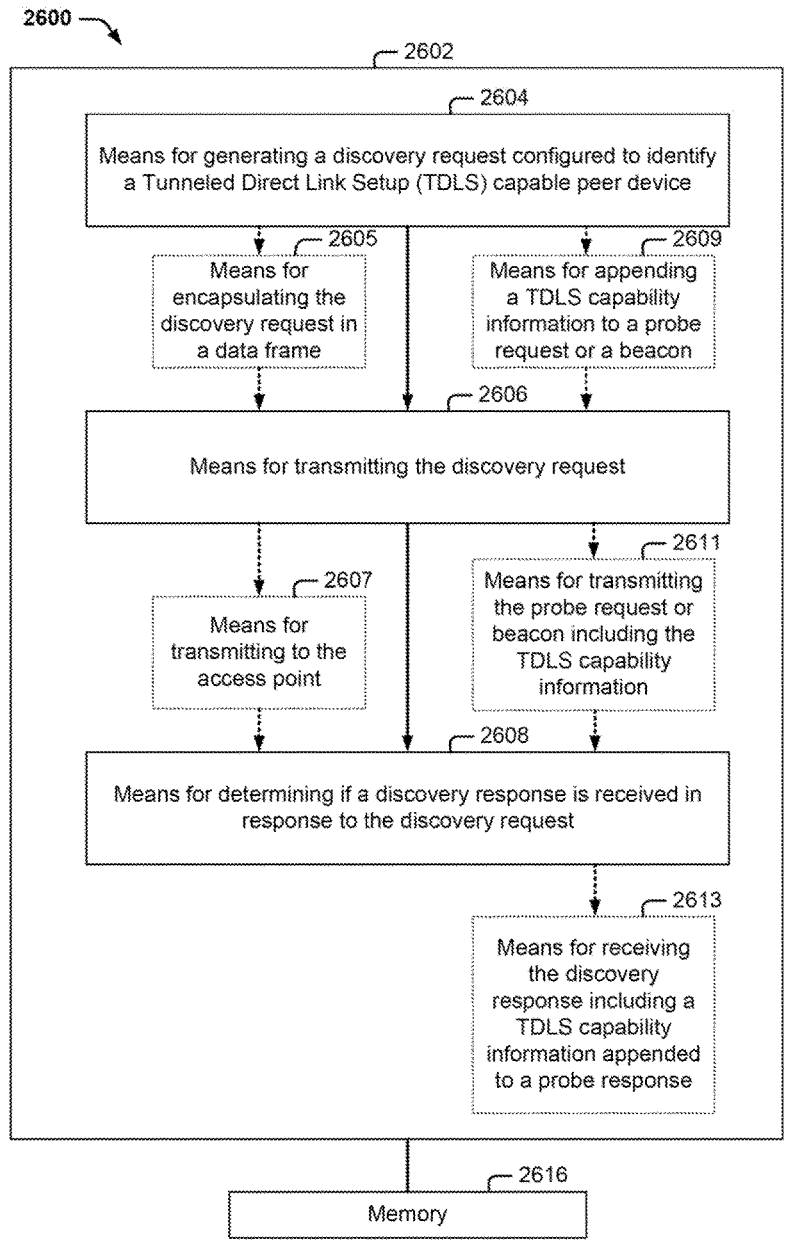
FIG. 26 is a schematic diagram of another aspect of a station (STA) for performing Tunneled Direct Link Setup (TDLS) discovery in a wireless communication network.

Referring to FIG. 26, based on the foregoing descriptions, an apparatus 2600 for performing Tunneled Direct Link Setup (TDLS) discovery in a wireless communication network may reside at least partially within a station, such as an access point and/or a client or mobile node. For example, apparatus 2600 may include, or be a portion of, stations 102, 104 and 106 of FIG. 1. It is to be appreciated that apparatus 2600 is represented as including functional blocks, which can be functional blocks that represent functions implemented by a processor, software, or combination thereof (e.g., firmware). Apparatus 2600 includes a logical grouping 2602 of electrical components that can act in conjunction. For instance, logical grouping 2602 can include means for generating a discovery request configured to identify a Tunneled Direct Link Setup (TDLS) capable peer device 2604. For example, referring to FIG. 1, means for generating discovery request 2604 may include peer discovery component 108 and/or discovery request generator 110. Alternatively, or in addition, referring to FIG. 25, means for generating discovery request 2604 may include processor 2001. Further, logical grouping 2602 can include means for transmitting the discovery request 2606. For example, referring to FIG. 1, means for transmitting the discovery request 2606 may include peer discovery component 108 and/or discovery request generator 110. Alternatively, or in addition, referring to FIG. 25, means for transmitting the discovery request 2606 may include processor 2001 and/or communications component 2003, or a portion thereof, such as a transmitter. Additionally, logical grouping 2602 can include means for determining if a discovery response is received in response to the discovery request 2608. For example, referring to FIG. 1, means for determining receipt of discovery response 2608 may include peer discovery component 108 and/or discovery response determiner 114. Alternatively, or in addition, referring to FIG. 25, means for determining receipt of discovery response 2608 may include processor 2001 and/or communications component 2003, or a portion thereof, such as a receiver.

In an aspect of apparatus 2600, the means for generating the discovery request 2604 may further include means for encapsulating the discovery request in a data frame 2605. For example, encapsulating enables the discovery request to be transparent to an access point. For example, referring to FIG. 1, means for encapsulating the discovery request in a data frame 2605 may include peer discovery component 108 and/or discovery request generator 110. Alternatively, or in addition, referring to FIG. 25, means encapsulating the discovery request in a data frame 2605 may include processor 2001. Accordingly, the means for transmitting 2606 may further include means for transmitting to the access point 2607. For example, the access point may then forward the discovery request on to other stations associated with the access point, wherein the encapsulating allows for the access point to forward the discovery request even if the access point is not configured to understand the discovery request.

In another aspect of apparatus 2600, the means for generating the discovery request 2604 may further include means for appending a TDLS capability information to a probe request or to a beacon 2609. For example, the probe request or the beacon may be based on P2P discovery. For example, referring to FIG. 1, means for appending TDLS capability information to a probe request or to a beacon 2609 may include peer discovery component 108 and/or discovery request generator 110. Alternatively, or in addition, referring to FIG. 25, means for appending TDLS capability information to a probe request or to a beacon 2609 may include processor 2001. Accordingly, the means for transmitting 2606 may further include means for transmitting the probe request or beacon including the TDLS capability information 2611. Additionally, the means for determining if a discovery response is received 2608 may also include means for receiving the discovery response including a TDLS capability information appended to a probe response 2613.

In an aspect, apparatus 2600 may include at least one processor or one or more modules of a processor operable to perform the means described above.

Additionally, apparatus 2600 may include a memory 2616 that retains instructions for executing functions associated with electrical components 2604, 2606, and optionally 2608, and 2605, 2607, 2609, 2611, and 2613. While shown as being external to memory 2616, it is to be understood that one or more of electrical components 2604, 2606, and optionally 2608, and 2605, 2607, 2609, 2611, and 2613, may exist within memory 2616. For example, in an aspect, memory 2616 may include memory 2002 and/or data store 2004 of FIG. 25.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc.

UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method performed by a station of determining Tunneled Direct Link Setup (TDLS) capable peer devices in a communications network, comprising:
   generating a discovery request configured to identify TDLS capable peer devices on the communications network, the discovery request indicating that a discovery response may be transmitted directly to the station;
   transmitting the discovery request for broadcast over the communications network; and
   receiving a direct transmission of one or more discovery responses directly from one or more TDLS capable peer devices, wherein each of the one or more discovery responses is associated with a corresponding TDLS capable peer device and comprises TDLS capability information for the corresponding TDLS capable peer device.

2. The method of claim 1, wherein generating the discovery request further comprises encapsulating the discovery request in a data frame such that the discovery request is transparent to an access point, and wherein the transmitting further comprises transmitting to the access point.

3. The method of claim 1, wherein generating the discovery request comprises appending a TDLS capability information of the station to a probe request, and wherein transmitting the discovery request comprises transmitting the probe request including the appended TDLS capability information.

4. The method of claim 1, wherein generating the discovery request comprises appending a TDLS capability information of the station to a beacon, and wherein transmitting the discovery request comprises transmitting the beacon including the appended TDLS capability information.

5. The method of claim 1, wherein at least one of the one or more received discovery responses comprises a TDLS capability information of a corresponding TDLS capable peer device, the TDLS capability information of the corresponding TDLS capable peer device being appended to a probe response from the corresponding TDLS capable peer device.

6. The method of claim 1, further comprising:
receiving, at the station, a new discovery request originating from another TDLS capable peer device,
generating, in response to the newly received discovery request, an additional discovery response comprising a TDLS capability information associated with the station, and
transmitting the additional discovery response including the associated TDLS capability information directly to the TDLS capable peer device that originated the newly received discovery request.

7. The method of claim 1, wherein at least one of the one or more discovery responses comprises a Probe response frame.

8. The method according to claim 1, wherein generating the discovery request includes piggybacking a Tunneled Direct Link Setup (TDLS) capability associated with the station onto a Probe frame using a peer-to-peer device discovery protocol for transmission.

9. The method of claim 8, wherein the Probe frame is a Probe request frame.

10. The method of claim 8, further comprising adding an association element to the Probe frame, wherein the association element includes information of a current association of the station.

11. The method of claim 1, further comprising:
forming a direct link with a selected TDLS capable peer device among the one or more directly responding TDLS capable peer devices based on TDLS capability of the selected TDLS capable peer device, that is specified in a discovery response from the selected TDLS capable peer device.

12. The method of claim 1, further comprising adding an association element to the discovery request, wherein the association element includes information of a current association of the station.

13. The method of claim 1, wherein at least one discovery response of the one or more discovery responses comprises a corresponding association element, the corresponding association element including information pertaining to a current association of a corresponding TDLS capable peer device that generated the corresponding at least one discovery response.

14. The method of claim 13, wherein the corresponding association element further comprises information pertaining to one or more of the following: security type of a direct link, operating channel, operating channel bandwidth, or current PHY rate to or from an access point (AP).

15. The method of claim 1, wherein generating the discovery request further comprises adding one of an extended capability element, a dialog token or a device type element to the discovery request.

16. The method of claim 1, wherein generating the discovery request further comprises generating a broadcast address for broadcasting of the discovery request using the broadcast address.

17. The method of claim 1, wherein generating the discovery request further comprises including a basic service set identifier (BSSID) that identifies a MAC address of an access point associated with the station.

18. The method of claim 1, wherein generating the discovery request further comprises:
including, in the discovery request, a discovery response indicator indicating whether a discovery response is to be sent when basic service set identifier (BSSID) associated with a TDLS capable peer device receiving the discovery request does not match a BSSID associated with the station.

19. The method of claim 1, wherein the discovery request comprises a TDLS request frame, and the method further comprises, after receiving the direct transmission of the discovery response:
receiving or transmitting, corresponding to at least one of the one or more discovery responses from the one or more TDLS capable peer devices, a corresponding at least one TDLS confirm frame; and
establishing, based on the corresponding at least one TDLS confirm frame, a direct link between an originator of the discovery request and a corresponding at least one TDLS capable peer device associated with the corresponding at least one TDLS confirm frame.

20. A non-transitory computer-readable medium comprising instructions for Tunneled Direct Link Setup (TDLS) capable peer device discovery on a station in a communications network, the instructions executable by a processor to:
generate a discovery request configured to identify a TDLS capable peer device on the communications network, the discovery request indicating that a discovery response may be transmitted directly to the station;
transmit the discovery request for broadcast over the communications network; and
receive a direct transmission of one or more discovery responses directly from one or more TDLS capable peer devices, wherein each of the one or more discovery responses is associated with a corresponding TDLS capable peer device and comprises TDLS capability information for the corresponding TDLS capable peer device.

21. An apparatus for Tunneled Direct Link Setup (TDLS) capable peer device discovery in a communications network, comprising:
means for generating a discovery request configured to identify a TDLS capable peer device on the communications network, the discovery request indicating that a discovery response may be transmitted directly to the apparatus;
means for transmitting the discovery request for broadcast over the communications network; and
means for receiving a direct transmission of one or more discovery responses, directly from one or more TDLS capable peer devices, wherein each of the one or more discovery responses is associated with a corresponding TDLS capable peer device and comprises TDLS capability information for the corresponding TDLS capable peer device.

22. An apparatus for Tunneled Direct Link Setup (TDLS) capable peer device discovery in a communications network, comprising:
a memory, and
a processor coupled to the memory, wherein the processor is configured to:
generate a discovery request configured to identify a TDLS capable peer device on the communications network, the discovery request indicating that a discovery response may be transmitted directly to the apparatus;

transmit the discovery request for broadcast over the communications network, and receive a direct transmission of one or more discovery responses, directly from one or more TDLS capable peer devices, wherein each of the one or more discovery responses is associated with a corresponding TDLS capable peer device and comprises TDLS capability information for the corresponding TDLS capable peer device.

23. The apparatus of claim 22, wherein, to generate the discovery request, the processor is further configured to:

encapsulate the discovery request in a data frame such that the discovery request is transparent to an access point; and transmit the discovery request to the access point.

24. The apparatus of claim 22, wherein, to generate the discovery request, the processor is configured to:

append a TDLS capability information of the apparatus to a probe request; and transmit the probe request including the appended TDLS capability information.

25. The apparatus of claim 22, wherein, to generate the discovery request, the processor is configured to:

append a TDLS capability information of the apparatus to a beacon; and transmit the beacon including the appended TDLS capability information.

26. The apparatus of claim 22, wherein at least one of the received discovery responses comprises a TDLS capability information of a corresponding TDLS capable peer device, wherein the TDLS capability information of the corresponding TDLS capable peer device is appended to a probe response for the corresponding TDLS capable peer device.

27. The apparatus of claim 22, wherein, the processor is further configured to:

generate an additional discovery response in reply to an additional discovery request originating from another TDLS capable peer device, and append a TDLS capability information associated with the apparatus to the additional discovery response; and transmit the additional discovery response including the associated TDLS capability information directly to the TDLS capable peer device that originated the additional discovery request.

28. The apparatus of claim 22, wherein at least one of the one or more discovery responses further comprises a Probe response frame.

29. The apparatus according to claim 22, wherein, to generate the discovery request, the processor is configured to:

generate the discovery request by piggybacking a Tunneled Direct Link Setup (TDLS) capability of the apparatus onto a Probe frame using a peer-to-peer device discovery protocol for transmission.

30. The apparatus of claim 29, wherein the Probe frame is a Probe request frame.

31. The apparatus of claim 29, wherein, to generate the discovery request, the processor is configured to:

add an association element to the Probe frame, wherein the association element includes information of a current association of the apparatus.

32. The apparatus of claim 22, wherein the processor is further configured to:

establish a direct link with a selected TDLS capable peer device among the one or more directly responding TDLS capable peer devices based on a TDLS capability of the selected TDLS capable peer device specified in a discovery response from the selected TDLS capable peer device.

33. The apparatus of claim 22, wherein, to generate the discovery request, the processor is configured to:

add an association element to the discovery request, wherein the association element includes information of a current association of the apparatus.

34. The apparatus of claim 22, wherein at least one discovery response in the one or more discovery responses comprises a corresponding association element, wherein the corresponding association element comprises information of a current association of a corresponding TDLS capable peer device that generated the corresponding discovery response.

35. The apparatus of claim 34, wherein the corresponding association element further comprises information pertaining to one or more of the following: security type of a direct link, operating channel, operating channel bandwidth, or current PHY rate to or from an access point (AP).

36. The apparatus of claim 22, wherein, to generate the discovery request, the processor is configured to:

add one of an extended capability element, a dialog token or a device type element to the discovery request.

37. The apparatus of claim 22, wherein, to generate the discovery request, the processor is configured to:

broadcast the discovery request using a broadcast address.

38. The apparatus of claim 22, wherein, to generate the discovery request, the processor is configured to:

include in the discovery request a basic service set identifier (BSSID) that identifies a MAC address of an access point associated with the apparatus.

39. The apparatus of claim 22, wherein to generate the discovery request, the processor is configured to:

include, in the discovery request, a discovery response indicator indicating whether a discovery response is to be sent when basic service set identifier (BSSID) associated with a TDLS capable peer device receiving the discovery request does not match a BSSID associated with the apparatus.

40. The apparatus of claim 22, wherein the discovery request comprises a TDLS request frame, and the processor is further configured to:

receive or transmit corresponding to at least one of the one or more discovery responses from the one or more TDLS capable peer devices a corresponding at least one TDLS confirm frame; and establish, based on the corresponding at least one TDLS confirm frame, a direct link between the apparatus and a corresponding at least one TDLS capable peer device associated with the corresponding at least one TDLS confirm frame.

* * * * *